United States Patent
Adam et al.

(10) Patent No.: US 8,364,075 B2
(45) Date of Patent: Jan. 29, 2013

(54) COOPERATIVE RELAY SCHEME HAVING BACKWARD COMPATIBILITY

(75) Inventors: Helmut Adam, Klagenfurt (AT); Wilfried Elmenreich, Klagenfurt (AT); Christian Bettstetter, Klagenfurt (AT)

(73) Assignee: Lakeside Labs GmbH, Klagenfurt (AT)

( * ) Notice: Subject to any disclaimer, the term of this patent is extended or adjusted under 35 U.S.C. 154(b) by 249 days.

(21) Appl. No.: 12/950,494

(22) Filed: Nov. 19, 2010

(65) Prior Publication Data

US 2011/0124284 A1    May 26, 2011

(30) Foreign Application Priority Data

Nov. 23, 2009 (EP) .................................... 09014573

(51) Int. Cl.
*H04B 3/36* (2006.01)
(52) U.S. Cl. .............. 455/7; 455/11.1; 455/13.1; 455/8; 455/9
(58) Field of Classification Search ................ 455/7–25; 370/492, 315, 318
See application file for complete search history.

(56) References Cited

U.S. PATENT DOCUMENTS

| | | | |
|---|---|---|---|
| 6,718,159 B1 | 4/2004 | Sato | |
| 7,907,540 B2 * | 3/2011 | Li et al. | ......................... 370/252 |
| 2006/0252367 A1 | 11/2006 | Haartsen | |
| 2010/0039947 A1 * | 2/2010 | Li et al. | ......................... 370/252 |
| 2011/0032864 A1 * | 2/2011 | Lee et al. | ....................... 370/315 |
| 2011/0122933 A1 * | 5/2011 | Adam et al. | .................. 375/219 |

FOREIGN PATENT DOCUMENTS

| | | |
|---|---|---|
| EP | 1924009 | 5/2008 |
| WO | WO2004/107693 | 12/2004 |
| WO | WO2008/038895 A2 | 4/2008 |
| WO | WO2009/044223 | 4/2009 |
| WO | WO2009/076995 | 6/2009 |

OTHER PUBLICATIONS

Adam, Helmut et al.; "Adaptive relay selection in cooperative wireless networks"; Sep. 15, 2008; IEEE Personal, indoor and mobile radio communications, 5 pages.

* cited by examiner

*Primary Examiner* — Fayyaz Alam
(74) *Attorney, Agent, or Firm* — Glenn Patent Group; Michael A. Glenn

(57) ABSTRACT

In a relay scheme, a wireless source apparatus, a wireless destination apparatus and a wireless relay apparatus cooperate for handling transmission failures by space/time diverse channels. In the case of the successful direct transmission, reduced or no additional overhead for the relay selection is incurred. Thus, for a good SNR between source and destination, the inventive protocol has similar performance as a standard approach. In the case of a transmission failure e.g., due to small scale fading, a transmission via different communication paths implementing spatial diversity via a selected relay is supported. The device is to only activate the overhearing of signals in case of weak signal quality between sender and receiver. This selection of relay devices is done of demand only. A specific protocol for the reservation of the wireless medium for the entire cooperative communication has been specified.

12 Claims, 15 Drawing Sheets

List of used Signaling Packets

| Abr. | Name | bytes |
|---|---|---|
| RTS | Request-To-Send | 20 |
| CTS | Clear-To-Send | 14 |
| ACK | Acknowledge | 14 |
| CCTS* | Cooperative Clear-To-Send | 16 |
| NACK* | Negative Acknowledge | 14 |
| ECR* | Extend-Channel-Reservation | 14 |
| AFR* | Apply-For-Relay | 14 |
| SFR* | Select-For-Relay | 20 |

FIGURE 5 simulation parameter

| | |
|---|---|
| $E_b/N_0$ at transmitter side | 40 |
| path loss exponent | 2.2 |
| SNR detection threshold | 1.5 |
| coherence time | 200 ms |
| data rate | 250 kbit/s |
| message size | 1000 byte |
| max contention slots | 255 |
| slot duration | 1 ms |
| SIFS | 0.5 ms |
| DIFS duration | 2.5 ms |
| EIFS duration | 5 ms |
| max small retries | 5 |
| max large retries | 5 |
| node density (based on transmission range) | 50 |

FIGURE 6 average number of potential relays throughput gain vs. distance S-D (a) PER vs. SD-distance (b) PER vs. message size at 2m SD-distance (c) PER vs. coherence time at 2m SD-distance Delay vs. SD-distance

COOPERATIVE RELAY SCHEME HAVING BACKWARD COMPATIBILITY

CROSS-REFERENCE TO RELATED APPLICATIONS

This application claims priority from European Patent Application No. 09014573.1, which was filed on Nov. 23, 2009, and is incorporated herein in its entirety by reference.

BACKGROUND OF THE INVENTION

Mobile radio communications suffer from large-scale and small-scale fading effects that attenuate the communication signal. While large-scale fading is caused by distance-dependent path loss and shadowing effects, small-scale fading is caused by multipath propagation. For mobile receivers or transmitters, small-scale fading can cause rapid fluctuations of the received signal-to-noise ratio (SNR); if a mobile device moves only a small distance it may experience deep fading even if it had perfect signal reception just an instant before.

Cooperative relaying [1] is a concept, where a relay node assists the communication between two nodes when the direct link is affected by fading. The information is relayed via a spatially different path which is likely not affected by the same fading effects as the direct link at the same time. Thus, using such a relay communication channel can improve the communication performance by implementing spatial diversity for the communication paths [12]. With the growing number of networked wireless devices in everyday appliances, there are more potential relay nodes within transmission range of a sender and receiver. Henceforth, cooperative relaying will gain additional importance in the near future.

Cooperative diversity is expected to be more beneficial, if the cooperative relaying protocol is designed according to the following: First, it should have a low overhead, for example in terms of sent messages, energy, storage, processing. A large number of communication attempts are expected to succeed without the need for alternative communication paths. Thus, in the case of a successful transmission, a cooperative relaying protocol should have minimal overhead in comparison to non-cooperative transmission schemes. Second, the protocol should exploit cooperative diversity to an extent that makes the effort for the more complex interaction between wireless nodes worth it.

Cooperative relaying can be divided into three main phases: direct transmission, relay selection, and cooperative transmission. In the direct transmission phase the source transmits its data, whereas destination and relay (or potential relays) try to receive it. In the relay selection phase a neighboring node of source and destination is selected. The cooperative transmission phase, where the relay forwards the data to the destination, occurs only if the destination has failed to retrieve the data from the source during the direct transmission.

The relay selection phase has a great impact on the performance of the whole cooperative relaying process [5]. The major selection criterion is the link quality of the communication participants which is typically measured by probing packets [6, 7, 10]. The selection can be further refined by using additional factors like residual power [8]. Note that the selection process also depends on the actual environment, i.e., it is important to know how frequently a relay needs to be selected for a given source destination pair, since a node may be a good relay at one time instant and a bad one later on. In the absence of any environment information, relays are selected for each packet anew [10]. Typically, relay selection is a distributed task which necessitates time and energy and thus introduces additional overhead. Therefore, it is beneficial to explore the current realization of the channel between source and destination and to do relay selection only on demand [9].

Relay selection can be done before direct transmission (proactive relay selection) or after direct transmission (reactive relay selection). Proactive relay selection is considered to have energy advantages over reactive relay selection since only the selected relay needs to spend energy for listening to the transmission of the source [10]. However, it introduces a constant overhead to all transmissions. Moreover, the channel state may change during the direct transmission phase. The selected relay might then not be able to receive the data, or the relay link to the destination can also change considerably making successful relaying unlikely. In reactive schemes, a relay is selected only if the destination is not able to receive the data from the source and asks for assistance (cf. iterative relaying [12]). Thus, reactive relay selection is only done if a direct transmission fails and relaying candidates have already received the original data from the source properly. A disadvantage is that all potential relaying nodes need to listen to the transmission of the source. Since many transceivers consume the same order of energy for receiving and transmitting [11], the costs for having all neighbors of source and destination listen might not be negligible.

Recently, cooperative relaying is no longer treated as a separate task but is investigated in combination with MAC protocols. It is beneficial to exploit channel reservation messages such as Request-To-Send (RTS) and Clear-To-Send (CTS) for probing the channel and selecting a relay [13, 14], since relays also need to make a channel reservation for the cooperative transmission phase. The herein proposed approach selects relays after the direct data transmission phase and thus, does not introduce additional delay to successful direct transmissions. In [13] neighbors determine whether cooperation is necessitated based on the channel quality between source and destination. Relay selection and the relay's channel reservation are done by using a slotted approach before the direct transmission.

Liu et al. introduce in [14] a protocol which uses information from the past, to determine whether the data transfer rate between two nodes can be improved by using a relaying node. Channel reservation for source, destination, and relay are done before direct transmission.

Moh et al. uses in [15] pro-active relay selection based on historical data and thus favor nearby neighbors as relay. Their protocol extends CSMA/CA to use distributed standard block codes (D-STBC) when needed, which allows the simultaneously transmission from two or more nodes. The cooperation is not just used for data transfer but also for signalling messages like RTS and CTS.

In summary, disadvantages of known relaying protocols are low flexibility, waste of resources including transmission resources/bandwidth on the one hand and battery power of wireless devices on the other hand due to the overhearing/storing of messages in relay devices, which would not have been necessitated.

SUMMARY

According to an embodiment, a wireless relay apparatus for receiving a source data message and for transmitting a relay data message based on the source data message may have: a transmitter section and a receiver section; and a controller configured for determining, whether the wireless relay apparatus will, when operating as a wireless relay apparatus, provide a transmission channel from a wireless source apparatus to a wireless destination apparatus via the wireless relay apparatus, which is better than a direct transmission channel from the wireless source apparatus to the wireless destination apparatus or for determining, whether the wireless destination apparatus necessitates a relay operation or does not necessitate a relay operation; configured for storing the source data message from a wireless source apparatus only when the transmission channel via the wireless relay apparatus is better than the direct transmission channel or when a relay operation is necessitated, and for not storing the source data message in the other case; and configured for controlling the transmitter to transmit the relay data message, the relay data message being based on the stored source data message, wherein a cooperative clear to send message received includes a channel condition estimate on the direct transmission channel between the wireless source apparatus and the wireless destination apparatus, and wherein the controller is configured for extracting the channel condition estimate from the cooperative clear to send message received to obtain a direct channel information, wherein the controller is configured for determining a relay channel information for the transmission channel from the wireless source apparatus via the wireless relay apparatus to the wireless destination apparatus, and wherein the controller is configured for comparing the direct channel information and the relay channel information to determine, whether the wireless relay apparatus will provide a better transmission channel.

According to another embodiment, a wireless destination apparatus for receiving a data message may have: a transmitter section and a receiver section; and a controller configured for interpreting messages received by the receiver section; configured for estimating a channel condition between a wireless source apparatus and the wireless destination apparatus in response to a request to send message originating from the wireless source apparatus; configured for controlling the transmitter section to transmit a clear to send message when the channel condition is good enough without a relaying operation and to transmit a cooperative clear to send message when the channel condition is so that a relaying operation will become necessitated, wherein the controller is configured to form the cooperative clear to send message so that a channel condition estimate is included in the cooperative clear to send message, wherein the controller is in a relay mode, when the cooperative clear to send message is transmitted and is in a non-relay mode, when the clear to send message is transmitted, and wherein the controller is configured to control the transmitter section to transmit, in the non-relay mode, an acknowledge message subsequent to transmitting a clear to send message and a successful receipt of a source data message, and to transmit, in the relay mode, a negative acknowledge message subsequent to transmitting a cooperative clear to send message and a non-successful receipt of the source data message.

According to another embodiment, a method of operating a wireless relay apparatus for receiving a source data message and for transmitting a relay data message based on the source data message, including a transmitter section and a receiver section; and a controller, may have the steps of: determining, whether the wireless relay apparatus will, when operating as a wireless relay apparatus, provide a transmission channel from a wireless source apparatus to a wireless destination apparatus via the wireless relay apparatus, which is better than a direct transmission channel from the wireless source apparatus to the wireless destination apparatus or determining, whether the wireless destination apparatus necessitates a relay operation or does not necessitate a relay operation; storing the source data message from a wireless source apparatus only when the transmission channel via the wireless relay apparatus is better than the direct transmission channel or when a relay operation is necessitated, and not storing the source data message in the other case; and controlling the transmitter to transmit the relay data message, the relay data message being based on the stored source data message, wherein a cooperative clear to send message received includes a channel condition estimate on the direct transmission channel between the wireless source apparatus and the wireless destination apparatus, and wherein the channel condition estimate is extracted from the cooperative clear to send message received to obtain a direct channel information, wherein a relay channel information for the transmission channel from the wireless source apparatus via the wireless relay apparatus to the wireless destination apparatus is determined, and wherein the direct channel information and the relay channel information are compared to determine, whether the wireless relay apparatus will provide a better transmission channel.

According to another embodiment, a method of operating a wireless destination apparatus for receiving a data message, including a transmitter section and a receiver section; and a controller, may have the steps of: interpreting messages received by the receiver section; estimating a channel condition between a wireless source apparatus and the wireless destination apparatus in response to a request to send message originating from the wireless source apparatus; controlling the transmitter section to transmit a clear to send message when the channel condition is good enough without a relaying operation and transmitting a cooperative clear to send message when the channel condition is so that a relaying operation will become necessitated, wherein, when the clear to send message is transmitted, an acknowledge message is transmitted subsequent to transmitting the clear to send message and a successful receipt of a source data message, and wherein, when the cooperative clear to send message is transmitted, a negative acknowledge message is transmitted subsequent to transmitting the cooperative clear to send message and a non-successful receipt of the source data message.

Another embodiment may have a computer program for performing, when running on a computer, the inventive methods.

The present invention is based on the finding that an efficient and flexible concept of cooperative relaying is obtained by having a wireless source apparatus performing an extended channel reservation subsequent to a transmission of the source data message. This extended channel reservation is only activated, when the wireless destination apparatus transmits a negative acknowledge message subsequent to a transmission of the data message by this wireless source apparatus.

A further aspect is that the wireless source apparatus transmits the source data message without any delay irrespective of, whether a cooperative relay is necessitated or not. Therefore, the data message transmission is not delayed until e.g. the best relaying candidate has been identified and selected.

The extend channel reservation (ECR) message transmitted/initiated by the wireless source apparatus makes sure that the wireless source apparatus, although already having transmitted the source data message has control over the channel reservation. The channel reservation is valid for devices in the neighborhood of the wireless source device currently not contributing to the cooperative relay scheme. Hence, it is made sure that wireless devices in the neighborhood of wireless source devices are efficiently blocked and do not interfere with the source devices' ability to receive an acknowledgement message from the destination. When a cooperative relay process is necessitated, then this acknowledgement message will be received after the whole relaying process.

In a further aspect, this ECR message is useful for triggering a contention procedure among several wireless relay apparatuses, when more than one potential relay apparatus candidate exists. In response to receiving the ECR message, the potential wireless relay apparatus is configured for initiating the contention procedures so that, in the end, a wireless relay apparatus surviving the contention procedure will transmit an apply for a relay (AFR) message or will transmit the data message itself, depending on the relay candidate selection algorithm implemented.

In a further aspect, the wireless destination apparatus cooperating with the wireless relay apparatus and/or the wireless source apparatus performs a destination-driven selection process for selecting a useful wireless relay apparatus among a plurality of wireless relay apparatus candidates. This procedure follows the transmission of a negative acknowledgement message from the wireless destination apparatus. Subsequent to the transmission of this negative acknowledgement message, the wireless destination apparatus will, in the end, transmit a select for relay (SFR) message identifying the selected wireless relay apparatus which is to perform the relay action, i.e., to transmit the relay data message to the wireless destination apparatus, so that this wireless destination apparatus can, in the end, transmit an acknowledgement message.

In a further aspect, the battery power consumed by overhearing/storing source data messages by potential relay candidates is effectively reduced. To this end, wireless relay apparatus candidates becoming aware of an upcoming communication between a wireless source apparatus and a wireless destination apparatus do not automatically store the source data message. Instead, in this aspect, the potential wireless relay apparatus candidate actually determines, as far as possible, by the relay apparatus whether a relaying operation involving the actual wireless relay apparatus candidate will, in fact, become necessitated at all or, provided that it will become necessitated, will actually be better than the direct source destination channel.

In a further aspect, a wireless destination apparatus, when being addressed by a request to send message from a wireless source apparatus estimates the channel condition between the wireless source apparatus and the wireless destination apparatus. Based on the determined channel condition, the wireless destination apparatus either sends a CTS message, when the channel is good enough, or sends a cooperative clear to send (CCTS) message indicating two potential neighboring relay candidates that a relaying operation will become necessitated. This feature enhances efficiency and backward compatibility due to the fact that it is avoided to perform a cooperative relaying operation. Instead, a cooperative relaying operation is only initiated when it is actually needed. When, however, the destination determines that a relaying operation is not necessitated, since the transmission channel for the direct transmission between source and destination is good enough, a straightforward clear to send message is transmitted which informs all neighboring devices that they do not have to spend any further bandwidth or battery power for being ready for a relaying operation, which will, however, never come due to the clear to send message rather than the CCTS message.

A further embodiment relates to a method or apparatus or computer program for operating a wireless destination apparatus for receiving a data message, comprising a transmitter section and a receiver section; and a controller, comprising: interpreting messages received by the receiver section; estimating a channel condition between a wireless source apparatus and the wireless destination apparatus in response to a request to send message originating from the wireless source apparatus; controlling the transmitter section to transmit a clear to send message when the channel condition exceeds a given threshold and to transmit a cooperative clear to send message when the channel condition does not exceed a given threshold.

BRIEF DESCRIPTION OF THE DRAWINGS

Embodiments of the present invention will be detailed subsequently referring to the appended drawings, in which:

FIG. 5 is a list of signaling packets/messages;

FIG. 6 is a table illustrating simulation parameters for the simulations illustrated in FIGS. 7 to 10;

DETAILED DESCRIPTION OF THE INVENTION

The invention relates to an innovative concept for cooperative relaying in wireless systems. If a signal transmitted from a sender device to a receiver device cannot be correctly received at the receiver device, the proposed method selects a relay device which could correctly receive the signal beforehand. The invention is advantageous over existing methods with respect to the following individual aspects: (1) Relay devices do only activate the overhearing of signals in case of weak signal quality between sender and receiver. (2) The selection of relay devices is done on demand only. (3) A specific process (protocol) for the reservation of the wireless medium for the entire cooperative communication has been specified.

A networked system consisting of a number of devices which are able to communicate with each other by wireless radio is assumed. The intended service is to deliver information from one network node, the source, to another network node, the destination.

Wireless links typically suffer from fading causing degradations of the communication channel. These fading effects on a channel may change over time and vary with the spatial position of a node. In cooperative relaying, an additional communication path is added via relaying nodes. Due to the spatial diversity, it can be assumed that the communication paths via relays have fading effects which are sufficiently uncorrelated to the fading problems on the original path. By selecting the communication path with the currently best physical properties, the information can be transmitted.

In accordance with aspects of the invention, at least one transmitter and one receiver are actively engaged in each communication. All other nodes may act as potential relay stations if, (1) they have a link to the transmitter as well as to the receiver, and, (2) the channel reservation response from the receiver indicates a bad channel state between transmitter and receiver (selection between potential relaying or non-relaying). All potential relays try to receive the packet broadcasted from the transmitter. If the receiver can decode the packet, the direct transmission has succeeded without the need for relaying. If the receiver cannot decode the packet, it starts a relay selection phase that involves all relays which have received the packet from the transmitter correctly. The relay selection phase involves an innovative protocol, which selects the relay with the best relay-destination channel within a defined time frame with high probability. The selected relay station transmit the packet to the receiver (cooperative transmission).

Figure 3:
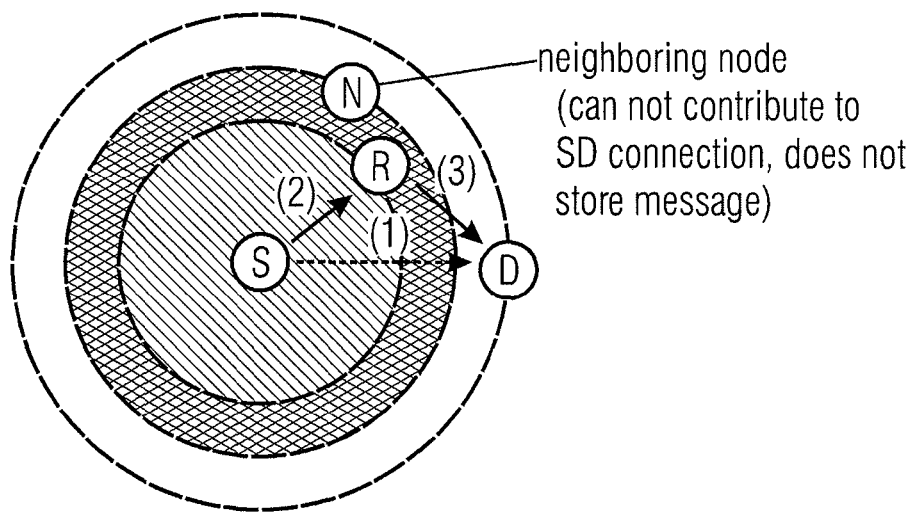
FIG. 3 is a diagram generally illustrating a cooperative relaying situation.

FIG. 3 depicts an example of cooperative relaying. The source node S tries to transmit a message to the destination D (see communication (1) in the figure). The signal strength of communication (1) is sketched by circles in different grayscale colors. Note that the particular signal strength and SNR ratio typically are not homogenous as indicated in the figure but may change significantly at a small scale. Nevertheless, this simple example is useful to depict the approach. It is assumed that the transmission does not reach the destination node with a signal strength that allows for a correct/complete decoding of the original message. Concurrently with communication (1), the message was overheard by node R (communication (2)). After that, node R forwards this information to the destination (communication (3)). Since the communication (2) and (3) took a different path than communication (1), this example implements spatial diversity. Since communication (1) and (3) are preformed subsequently, the presented approach also contains the concept of time diversity.

As long as messages can be overheard by potential relays and the relays experience uncorrelated fading effects—both of these assumptions hold for typical wireless systems—the cooperative relaying approach is effective for increasing the reliability and/or network throughput. The approach is also efficient in terms of number of sending operations, since (1) and (2) originate from a single broadcast operation. FIG. 3 additionally illustrates a neighboring node N which, for example, overhears the message from the source device S, but can, for example, not contribute to the source destination connection, so that the connection is improved by the relaying operation. In one embodiment, as described later, this neighboring node N determines that it cannot contribute, so that this neighboring node does not waste resources by storing messages from the source device.

MAC changes considerably in the presence of cooperative relaying. In non-cooperative schemes, the wireless medium is reserved just in the neighborhood of source and destination for the time of the direct transmission and the acknowledgment. In cooperative relaying, however, the channel reservation needs to be extended in space and time for the relaying. This leads to reduction of the spatial re-usability of the network since the channel reservations for the relay might interfere or block other communications which otherwise could be done concurrently if the relay is not used. Furthermore, in proactive relay selection, relays are selected and the channel floor for them are reserved before direct transmissions. Whenever the direct transmission succeeds, those reservations block other communications and degrade the overall throughput.

An advantageous inventive aspect is that the system is efficient in cases when relaying is not needed. Thus, the introduced overhead by cooperative relaying is minimized. The system follows a reactive relay selection approach such that it behaves similar to standard non-cooperative protocols in the absence of link errors on the direct link in terms of throughput. Besides reducing the introduced overhead when cooperation is not needed, reactive relay selection also inherently prioritizes direct transmission with respect to cooperative ones. Inventive aspects also address the higher energy consumption of reactive schemes by determining whether cooperation can be used or not before direct transmission and by limiting the number of nodes listening to the data transmission between source and destination.

Figure 4:
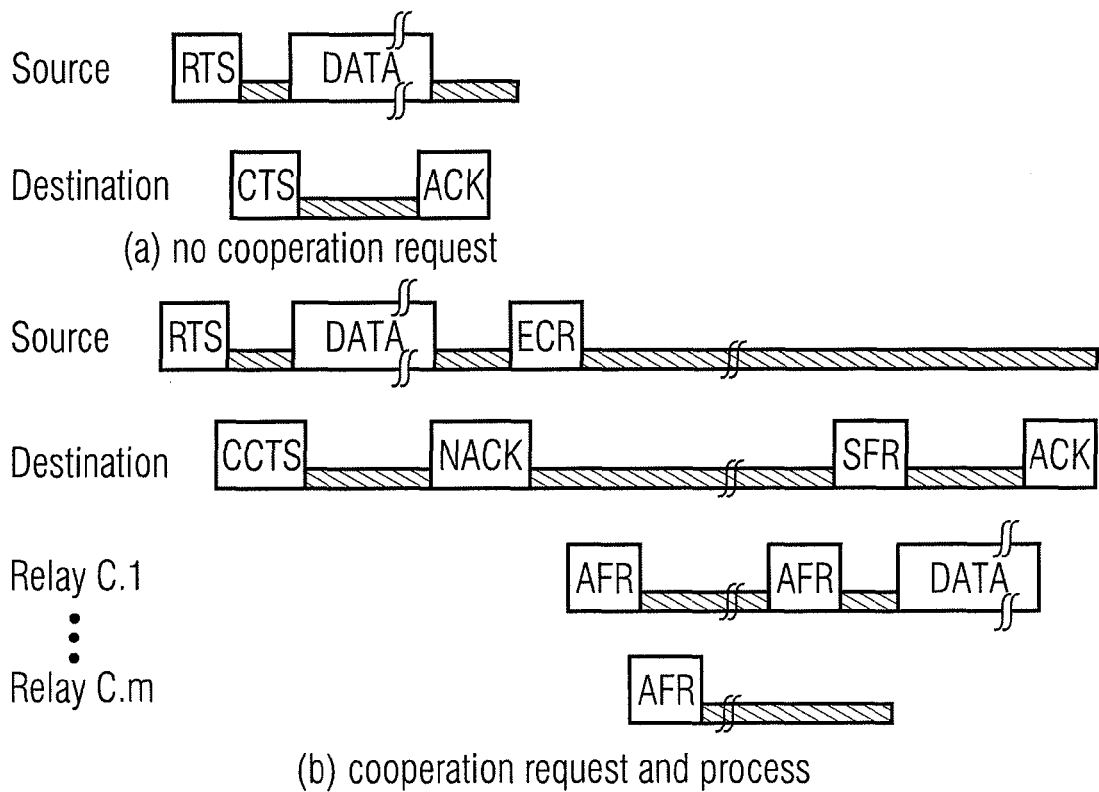
FIG. 4 is a packet exchange and channel reservation diagram.

Four different aspects of the present invention are subsequently described in more detail with respect to FIGS. 1a to 2f, the complete package exchange and general reservation schedule of an embodiment of the present invention is described in the context of FIG. 4. FIG. 4 indicates time running from left to right and illustrates, under letter (a) a straightforward efficient procedure without a cooperation request. Under letter (b), the time sequence of commands sent by source, destination and different relay candidates is illustrated Hereafter we referred to the channel between source-destination, source-relay, and relay-destination as SD-channel, SR-channel, and RD-channel, respectively. The multi-hop channel between source and destination via the relaying node is addressed by SRD-channel.

FIG. 4 depicts channel allocations and packet exchange for successful and failed direct transmissions and FIG. 5 summarizes the names and the size of the used signaling packets of our protocol. Packets marked with * are modified versions of standard CSMA/CA packets or newly introduced ones. The length of the packets has been chosen in compliance with IEEE 802.11. Signaling packets are sent using a lower modulation scheme that is slower, but less prone to transmission errors than the modulation of the data message. Dark bars in FIG. 4 indicate channel reservations of a particular node.

A communication attempt starts with an RTS transmission from the source which is used to inform the intended destination about the duration of the data transmission and reserves the channel floor until the response of the destination is received. At reception of an RTS, the destination decides whether cooperation is needed or not (see section 3.4). If the destination does not reply (i.e., it has not received the request or it is not allowed to answer due to another communication), a back off like in CSMA/CA is performed. Each unanswered RTS increases the small message retry counter. If this counter exceeds a maximum value the data is dropped. In FIG. 4a we show the message exchange and channel reservation for the case where no cooperation is requested. The destination replies with a CTS message, which reserves the channel for the data transmission of the source. When the source receives the CTS message it starts transmitting the data message. The data message extends the channel reservation in the vicinity of the source until reception of an Acknowledge (ACK) message from the destination. Note, that there is no additional delay introduced compared to CSMA/CA. If the direct transmission fails, the large message retry counter is incremented. Until the value of this counter exceeds a specified maximum value, the source tries to occupy the channel for a retransmission. Otherwise the data message is dropped.

The message exchanges and the channel reservations if the destination decides to use cooperation are depicted in FIG. 4b. The destination uses a CCTS message, which contains the information of a CTS message extended by the SNR value of the SD-channel, to inform source and neighbors that cooperation is necessitated. The channel reservation of a CCTS lasts until the end of the data transmission. The reception of the CCTS triggers the same actions at the source as a CTS. Thus, if the direct transmission succeeds, there is no additional overhead in comparison to CSMA/CA, except for a 14% transmission time increase for the CCTS instead of CTS, which is not significant since the control message itself only accounts for a small part of the overall message transmission time.

When the direct transmission fails the destination uses a Negative-Acknowledge (NACK) message to inform source and relaying candidates that a cooperative transmission is necessitated. The NACK extends the channel reservation of the destination until the end of the relay selection phase. Since the source needs to know the success of the cooperative transmission, it extends its own channel reservation until the expected ACK reception by broadcasting an Extend-Channel-Reservation (ECR) message. After this message the slotted relay selection process starts where relaying candidates use Apply-For-Relay (AFR) messages to indicate their relaying readiness. These messages are also used to reserve the channel floor until the end of the relay selection phase. Reservations in the relay selection phase (i.e., those done by NACK, ECR, and AFR messages) only block nodes which are not participating in this cooperative transmission attempt to access the channel, e.g., relaying candidates are not prevented from sending their AFR messages. At the end of the relay selection phase the destination transmits an SFR message which selects the current relay and also extends the channel reservation until the end of the data transmission from the relay. At reception of the SFR the selected relay starts transmitting the overheard data from the source. Finally, the destination signals the success of the cooperation. If the cooperation attempt is not successful, retransmission from the source is invoked. In the retransmission phase the channel reservation process in FIG. 4 is repeated.

Figure 11:
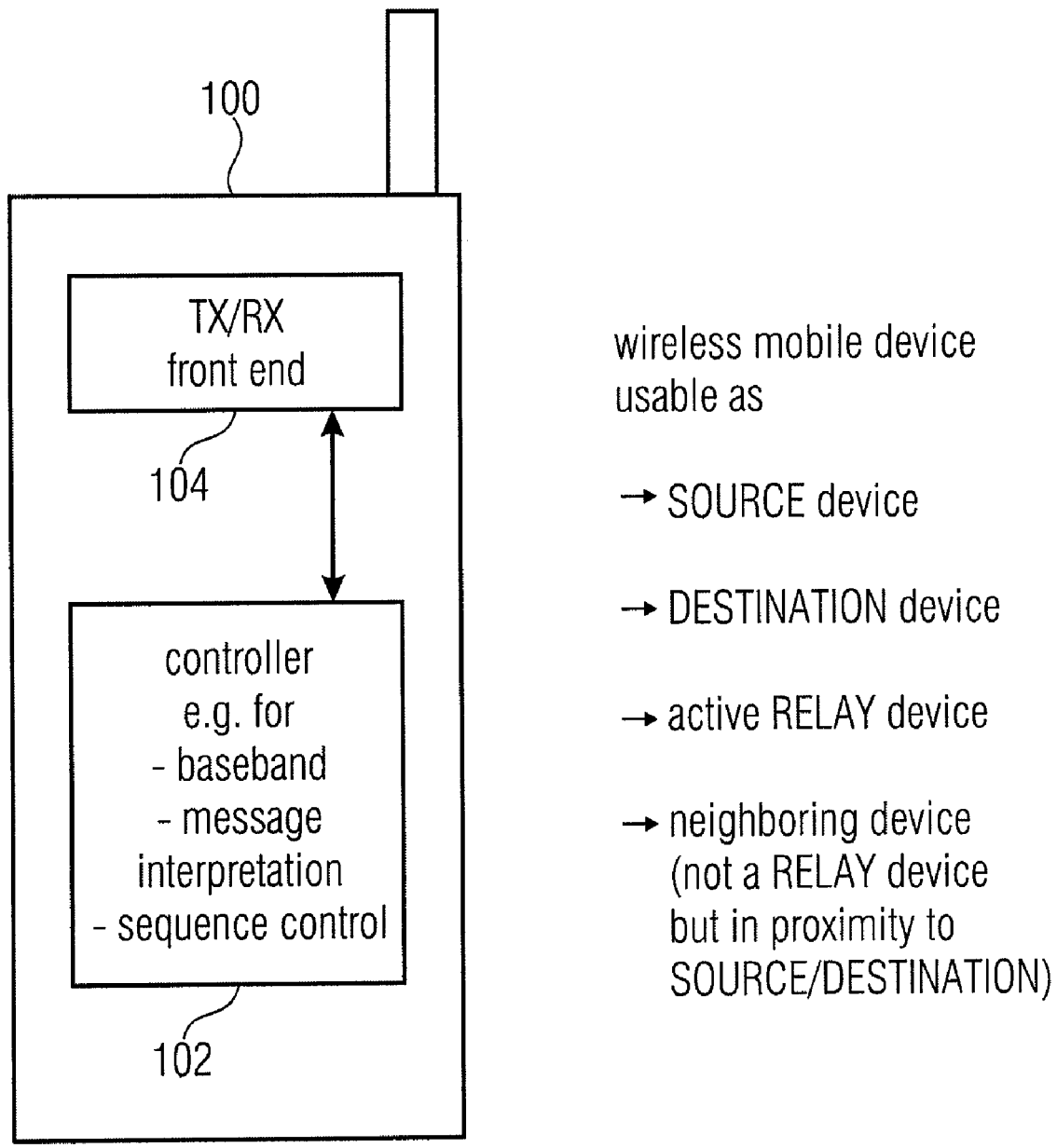
FIG. 11 illustrates a wireless mobile apparatus usable as a wireless source apparatus, a wireless destination apparatus, an active wireless relay apparatus or a neighboring wireless apparatus not participating in a current cooperative relaying scheme.

FIG. 11 illustrates a wireless mobile device. The wireless mobile device can be implemented as a wireless source apparatus, a wireless destination apparatus or a wireless relay apparatus. A wireless mobile device is implemented to be in the position to fulfill all three functionalities, i.e., the functionality of a source, of a destination or a relay in accordance with the inventive aspect. However, this is not necessarily the case, since a device that can only act as a source device or a destination device or a relay device will already incur improvements.

The wireless apparatus illustrated in FIG. 11 at 100 comprises a controller 102 and a transmitter section and receiver section 104, which is also named to be a TX/RX front end. The controller 102 may comprise known elements, such as a microprocessor, volatile storage, non-volatile storage, interfaces and other elements necessitated to provide the functionality of a mobile device and, particularly, to provide the sequence of steps in accordance with aspects of the protocol illustrated in FIG. 4.

In a flowchart for a wireless source device implementing the procedure illustrated in FIG. 4, the controller will make sure that the source apparatus sends an RTS message 110. The request to send message will comprise, among others, at least the identification of the intended destination apparatus. Additionally, the request to send message may comprise data on the amount or length of a data message to be sent by the wireless source apparatus.

In the case of the cooperative relay situation, the wireless source apparatus will receive, in a subsequent step, a CCTS message 112. Basically, the controller 102 in FIG. 11 will monitor messages incoming over the transmitter/receiver section 104. In accordance with a specified protocol, the controller is configured for interpreting incoming messages and, as soon as the controller interprets an incoming CCTS message having an identification of the wireless source device or any other link to the RTS message sent in step 110, the controller of the wireless source apparatus will go over to step 114. In step 114, the data message, i.e., the source data message is sent out via the transmitter/receiver section 102 in FIG. 11. Then, the subsequent step 116 of the wireless source apparatus will be to receive a negative acknowledge message (NACK) from the intended wireless destination device. This is not surprising, since the wireless destination apparatus has already sent a CCTS message before, indicating that the direct channel between source and destination is not good enough.

Subsequent to the reception of the NACK message, the source apparatus will send out an ECR message 118, making sure that all neighboring devices in the neighborhood of the wireless source apparatus are blocked from using the reserved channel resources. This allows the wireless source apparatus to be in the position to listen to a final acknowledgement from the wireless destination apparatus, which the wireless destination apparatus will send out as soon as the relaying process was successful, i.e., the relay data message has been successfully transmitted from a relay apparatus to the destination apparatus. Hence, the relaying process is terminated by transmitting the acknowledgement message from the wireless destination apparatus, and, with respect to the wireless source apparatus illustrated in FIG. 1a, the relaying process is terminated by receiving the acknowledgement message as indicated at 120 in FIG. 1a. In response to the receipt of the acknowledgement message from the wireless destination apparatus, the wireless source apparatus is in the position to start a new data transmission by issuing a new RTS message. Naturally, the wireless source apparatus can change its role so that, in the next cycle, the wireless source apparatus can become a destination apparatus or a relay apparatus, when the mobile device according to which the FIG. 1a procedure is implemented, does not only have the functionality of a wireless source apparatus, but also has the functionality of a wireless destination apparatus or a wireless relay apparatus.

Figure 1A:
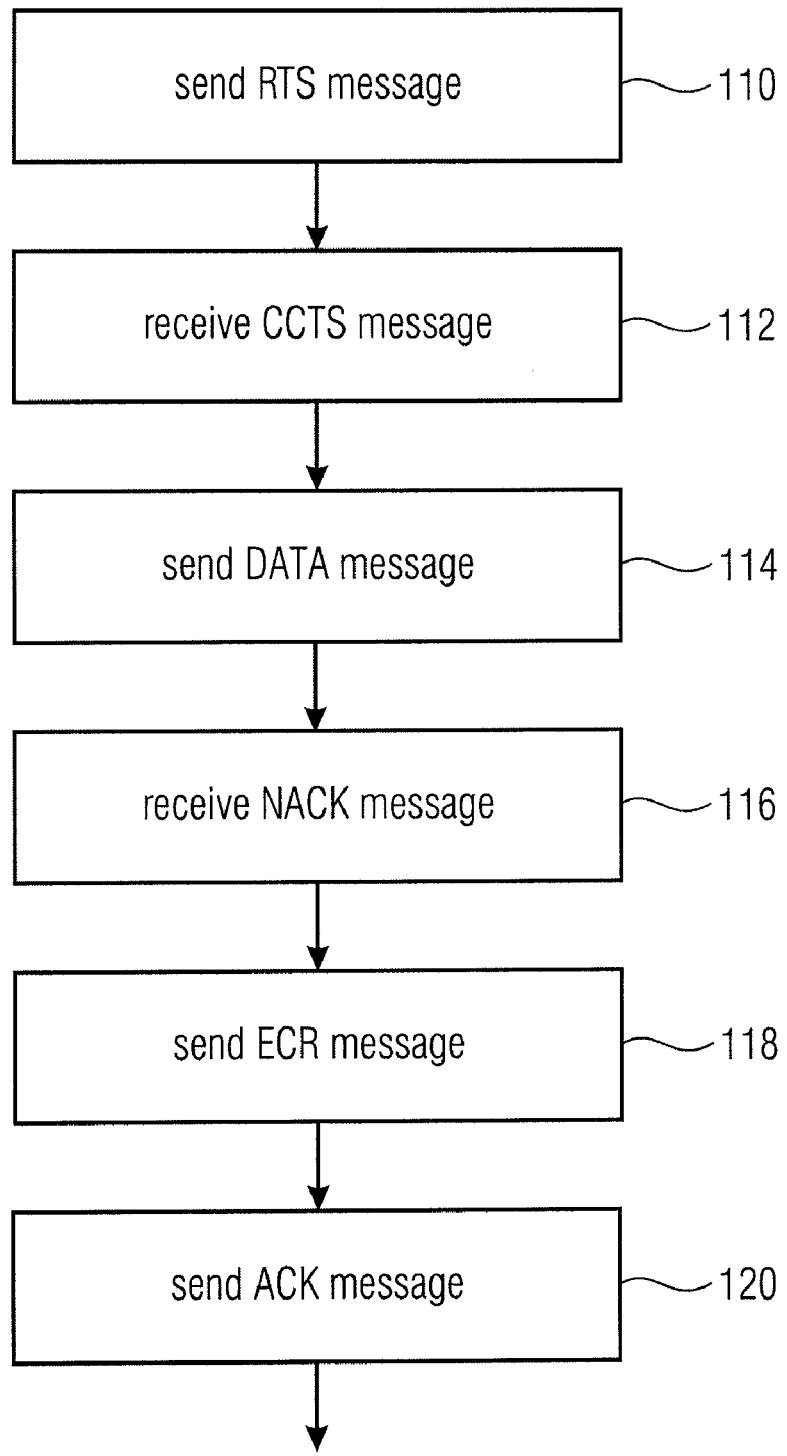
FIG. 1a is a flowchart illustrating actions performed by a wireless source device.
Figure 1B:
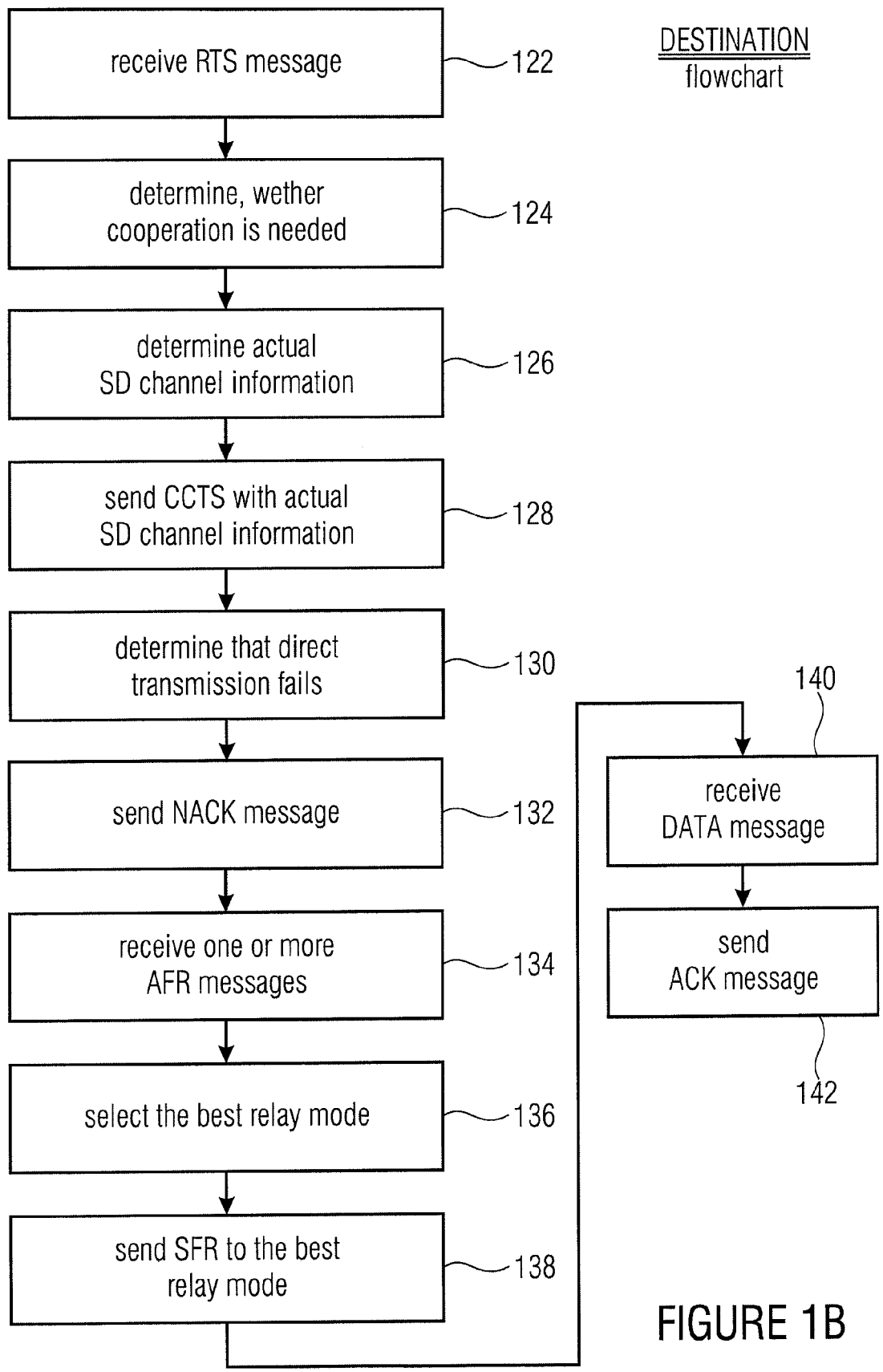
FIG. 1b is a flowchart illustrating actions of a wireless destination apparatus.

FIG. 1b illustrates the procedure performed within a wireless destination apparatus, where the sequence of steps is implemented by the functionality of the controller 102, illustrated in FIG. 11.

The destination apparatus starts its process by receiving an RTS message 122 from a wireless source device. The RTS message includes, among others, an identification of the wireless destination apparatus. In step 122, the wireless destination apparatus determines whether a cooperation is needed, or whether a direct channel is good enough for a successful transmission of the source data message. When step 124 results in a decision that a cooperation is not necessitated, the destination apparatus outputs a CTS message and the procedure proceeds as illustrated in FIG. 4a. Then, a relaying process is not necessitated at all and a straightforward direct transmission is performed, which is the most efficient and most rapid data transmission. When, however, it is determined by the destination apparatus that a cooperation is needed, the actual source destination channel is determined as indicated at 126. To this end, the destination apparatus determines a general estimate of the actual SD channel which is an SNR value of the direct source drain channel as determined by the reception of the RTS message from the wireless source apparatus.

In step 128, the wireless destination apparatus issues a CCTS message which includes the source destination channel information as determined in step 126. In step 130 the controller in the wireless apparatus determines, whether the direct transmission has failed. When the direct transmission has not failed, the wireless destination apparatus would issue an acknowledgment (ACK) message and a cooperation operation would not be performed although initiated in step 124. The more probable case, however, is that step 130 results in the outcome that the direct transmission of the source data message to the destination has failed. This means, in other words, that a bit error rate or a packet error rate is higher than an admissible threshold. In this case, the wireless destination apparatus proceeds with step 132, i.e., by sending a negative acknowledge message NACK. Now, a relay contention protocol is started. This results in the reception of one or more AFR messages 134 depending on the number of potential relay candidates. In step 136, the wireless destination apparatus selects one of the available relay candidates and selects the best relay candidate. The best relay candidate is the candidate which has the best signal to noise ratio with respect to its AFR message. In other words, the destination apparatus determines the signal to noise ratio associated with the AFR message, and then sends an SFR message to the best relay apparatus 138. To this end, the AFR message comprises an identification of the apparatus, from which the AFR message originates, and the SFR message from the destination comprises an identification of the wireless apparatus, which has sent the corresponding AFR message.

As soon as the wireless destination apparatus has transmitted the SFR message to select the best relay node, the relay node will start sending the stored data message, and this stored data message is received in step 140. As soon as the wireless destination apparatus has successfully received the data message, the wireless destination apparatus sends out an acknowledgement message 142. Then, the relaying process is successfully completed and a new cycle can start. Again, the wireless destination apparatus can change its role in the new cycle so that the wireless destination apparatus operates in the new cycle as a wireless source apparatus or a wireless relay apparatus.

Figure 1C:
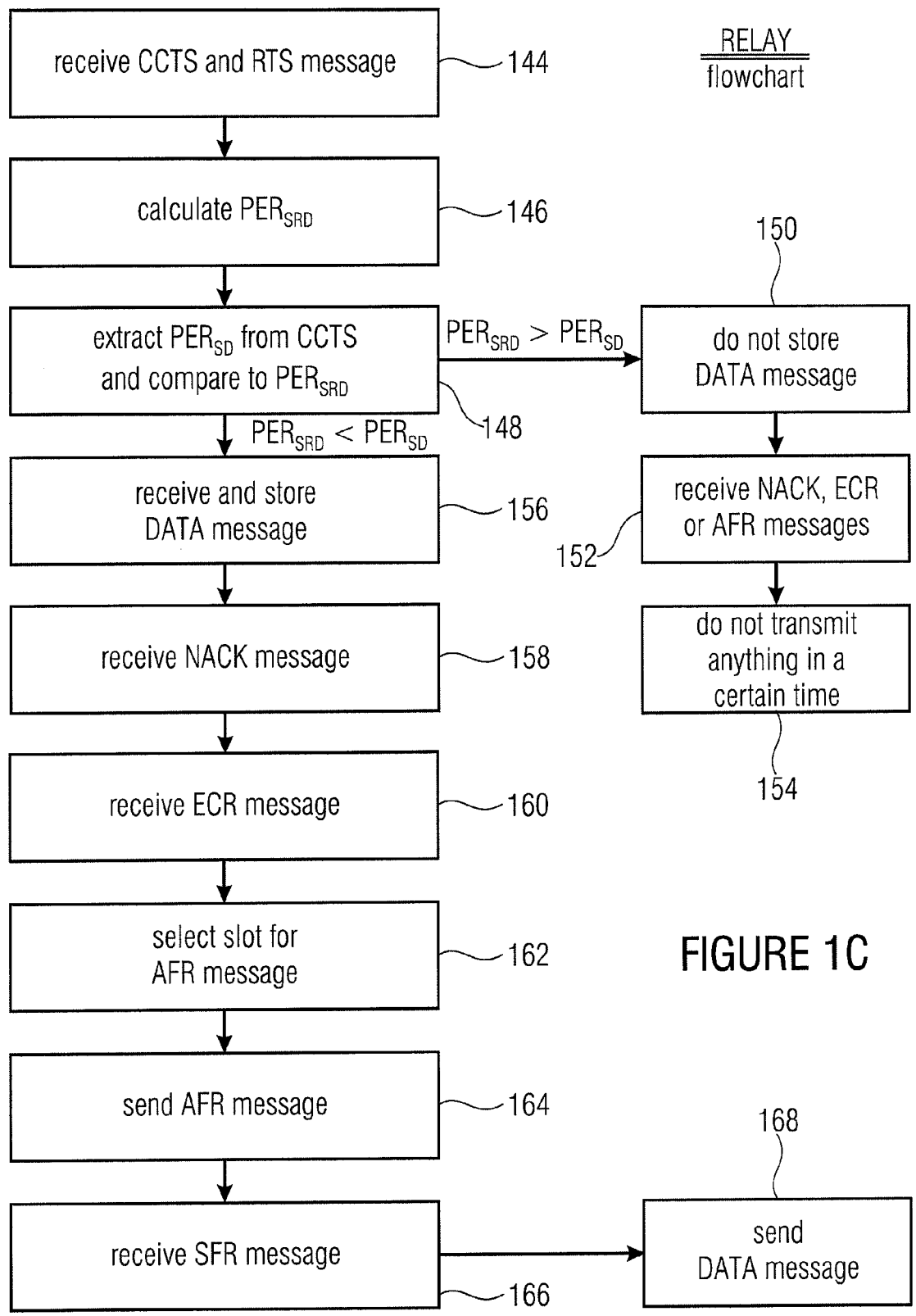
FIG. 1c is a flowchart illustrating actions of a wireless relay apparatus.

FIG. 1c illustrates the procedure performed by a wireless relay apparatus in accordance with an embodiment. The relay apparatus receives overheard CCTS and RTS messages in step 144. In step 146, the wireless relay apparatus calculates the channel of a transmission path between the wireless source apparatus, the wireless relay apparatus and the wireless destination apparatus. This relay channel estimation is performed by calculating the SNR associated with the reception of the CCTS message and the SNR associated with the reception of an RTS message. Naturally, the SNR values are determined for corresponding RTS/CCTS pairs, i.e., for a CCTS message from a wireless device identified by the preceding RTS message. The relay channel information is calculated as a packet error rate value as indicated in step 146. In step 148, the wireless relay apparatus extracts a packet error rate from the source for the destination, i.e., for the direct channel. This value cannot be calculated by the relay apparatus itself, since the relay apparatus cannot be aware of the direct channel. Therefore, the relay apparatus extracts the value of the direct channel from the received CCTS message. Then, the direct channel can be compared to the relay channel by the wireless relay apparatus. When the direct channel is better than the relay channel, then the relay device determines that a relaying over this relay device does not result in any improvement. In this case, the relay apparatus does not store the overheard data message as indicated at 150, and the relay apparatus does not engage in any relay contention protocol. Furthermore, the relay apparatus has saved considerable resources with respect to memory and battery power due to the fact that it has not stored the data message. In a step 152, the relay apparatus overhears NACK, ECR or AFR messages and understands these messages so that the apparatus illustrated in FIG. 1c will not use resources reserved by these messages in order to not disturb the relay contention operation and the final data transmission of a different relay node which can actually improve the direct channel from source to destination as indicated in step 154.

When however, the relay device has determined that it will improve the transmission situation, e.g., when the packet error rate of the relay channel is smaller than the packet error rate of the direct channel, the relay apparatus receives and stores the data message transmitted by the source apparatus as indicated at 156. The next event experienced by the relay apparatus will be the reception of an NACK message 158 and the reception of an ECR message 160. Subsequent to either the NACK message or the ECR message or the sequence of the messages, the relay apparatus selects a transmission resource for the to be transmitted AFR message 162. The selection of the necessitated data transmission resource such as a time slot or a frequency carrier or a code channel or a spatial channel is performed by a certain contention algorithm. Subsequent to the selection of a certain resource such as a time slot, the relay apparatus transmits an AFR message which has an identification of this wireless relay apparatus. When the relay apparatus is selected to be the actual relaying device, the relay apparatus receives an SFR message having an identification of this wireless relay apparatus as indicated at 166. When, however, the wireless destination apparatus has selected a different relay apparatus, the relay apparatus does not output any data. When, however, the relay apparatus has been selected, the next step is the transmission of the stored data message 168, As soon as the data message is transmitted the general reservation with respect to the relay apparatus is cancelled and the relay apparatus is ready for other actions. As indicated in FIG. 4b, the relay apparati which have not been selected by the SFR message reset their protocol state and become available for other communications in the network.

Figure 2A:
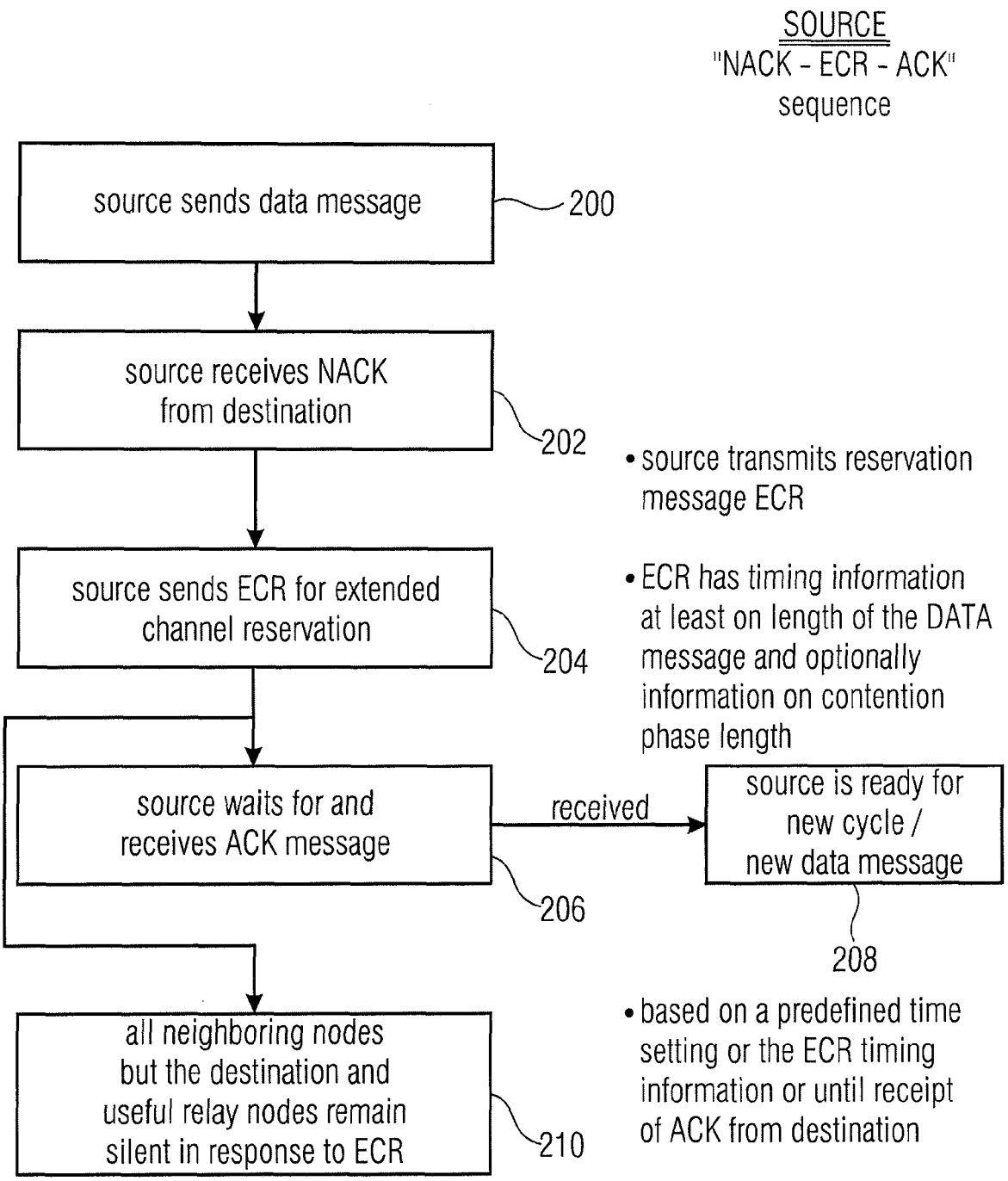
FIG. 2a is a diagram illustrating the functionality of a wireless source apparatus in accordance with one aspect.

FIG. 2a illustrates a wireless source apparatus for transmitting a source data message which performs a specific NACK-ECR-ACK sequence. In accordance with this embodiment, the wireless source apparatus comprises a transmitter section and a receiver section. Furthermore, the wireless source device comprises a controller configured for controlling the transmitter section to transmit a source data message illustrated at 200 in FIG. 2a. Subsequent to the transmission of the data message, the controller is configured for interpreting incoming messages received by the receiver section. When a message received by the receiver section is interpreted to be an negative acknowledgment message as indicated at 202, the controller is configured for controlling the transmitter section to transmit an ECR message 204. This ECR message is specifically transmitted when a message received by the receiver section is interpreted to be a negative acknowledgement message from a wireless apparatus being an intended destination of the source data message. The controller is configured for setting the wireless source apparatus in a wait mode 206, in which the wireless source apparatus is ready to receive an ACK message from the intended wireless destination apparatus. As soon as the ACK message is received, the wireless source device is ready for a new cycle or a new data message depending on the actual functionality/role of the wireless devices in the next procedure.

Specifically, it is to be outlined that all neighboring nodes but the destination node and actually useful relay nodes remain silent in response to the ECR message as indicated at 210.

Thus, specifically the features of the FIG. 2a embodiment are that the source transmits a reservation message ECR which effectively blocks nodes being positioned close to the source device for using critical transmission resources. As illustrated in FIG. 4b, the same is done for nodes in the neighborhood of the wireless destination apparatus, since these devices interpret the NACK message of the destination apparatus as a channel reservation and the only wireless relay devices which are not blocked by this channel reservation are the wireless relay apparatus candidates which have determined by themselves that they can positively contribute to the data transmission between the source device and the destination device.

It is a specific feature of the FIG. 2a embodiment that the reservation message ECR is transmitted by the source rather than any other contributing party. Furthermore, it is advantageous that the ECR message has timing information at least on the length of the following data message, which of course, is known to the source of the data. Furthermore, the ECR message additionally comprises information on the time length of the contention phase following the ECR message.

Additionally, it is to be noted that the length of the reservation initiated by the ECR message is in one embodiment, based on the predefined time setting or is determined by timing information included in the ECR message or actually lasts until the receipt of the ACK message from the destination. Then, all channel reservations can be cancelled by all devices which had any channel reservations before, since the transmission operation has been successfully completed.

Figure 2B:
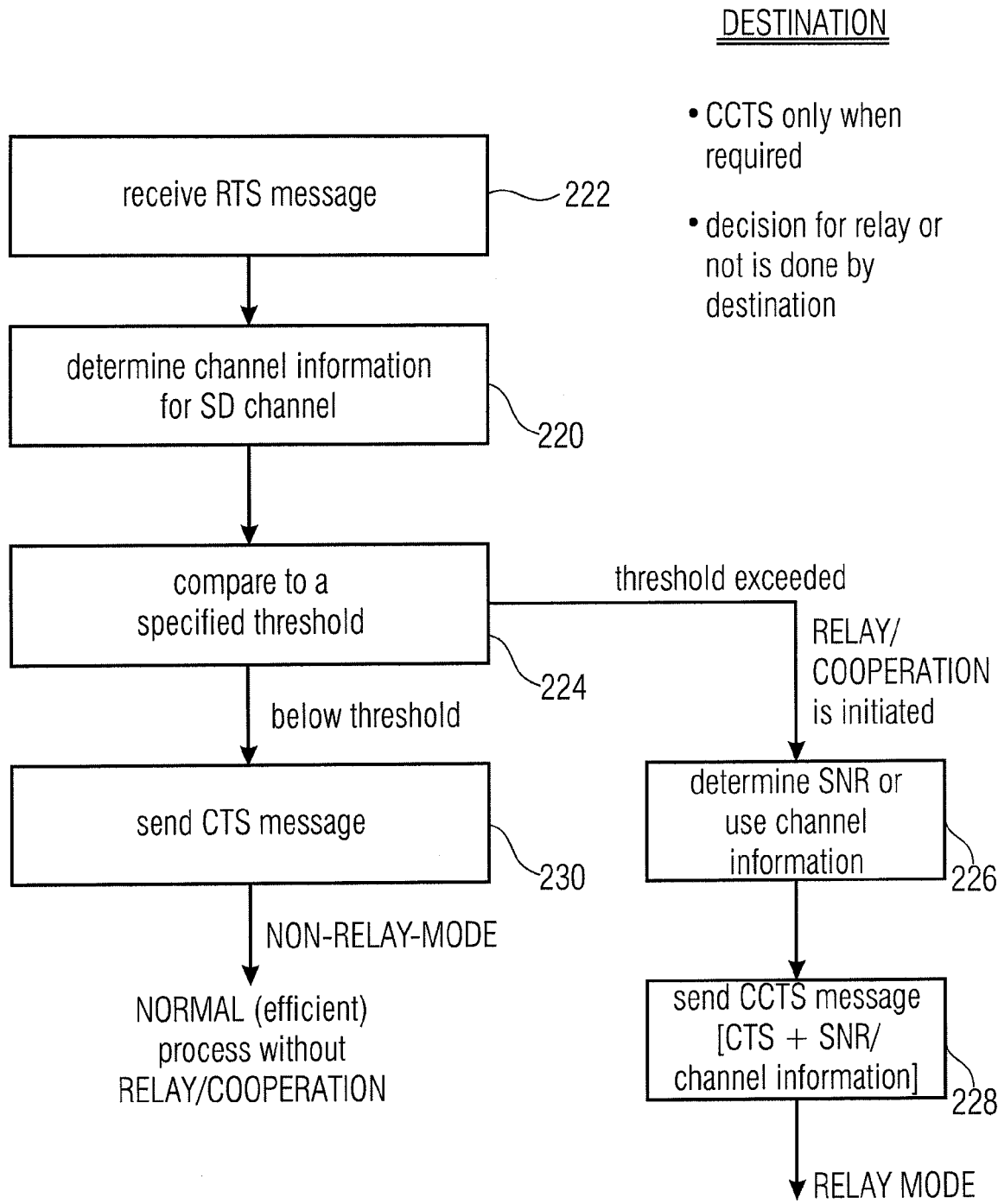
FIG. 2b is a diagram illustrating the procedure performed by a wireless destination apparatus in accordance with a further aspect.

FIG. 2b illustrates an additional embodiment of a wireless destination apparatus for receiving a data message. Again, the wireless destination apparatus comprises a transmitter section and a receiver section such as item 104 of FIG. 11 and a controller such as 102 in FIG. 11. The controller is configured for interpreting messages received by the receiving section and is configured for estimating a channel condition between a wireless source apparatus and a wireless destination apparatus 220 in response to an RTS message originating from the wireless source apparatus 222. In a step 224, the controller compares the channel information for the direct channel to a specified threshold. When the threshold is exceeded, this means that a relay/cooperation is necessitated so that in this instance, step 226 determines an SNR based on the reception of the RTS message, or generally, uses the channel information determined in step 220. In step 228, the destination apparatus sends a CCTS message, which is similar to a CTS message apart from an additional SNR estimate or generally, a channel information. Subsequent to sending the CCTS message, one can say that the controller is in a relay mode. When however, it is determined in step 224 that the channel information such as a packet error rate PER or bit error rate BER is below the threshold, steps 226 and 228 are not performed, and instead, a straightforward CTS message is sent 230, which means that the normal efficient process without relay/cooperation is used when possible, and which additionally means, that the more efficient relay mode is only used when necessitated, and is for example not used all the time which would highly contribute to a waste of battery power, transmission resources etc. Although a determination between the non relay mode and the relay mode is done depending on whether channel information exceeds or is below a threshold, it is clear that, depending on the actually channel, the situation can be vice versa, i.e., that a certain threshold has to be exceeded to go into the non-relay mode, and a value has to be below the threshold in order to go into the relay mode. Generally, the non-relay mode is selected when the general information determined in step 220 has a first relation with respect to the threshold, and the relay mode is selected when the channel information has a second relation to a threshold which is different from the first threshold, and which is the opposite of the first relation.

Figure 2C:
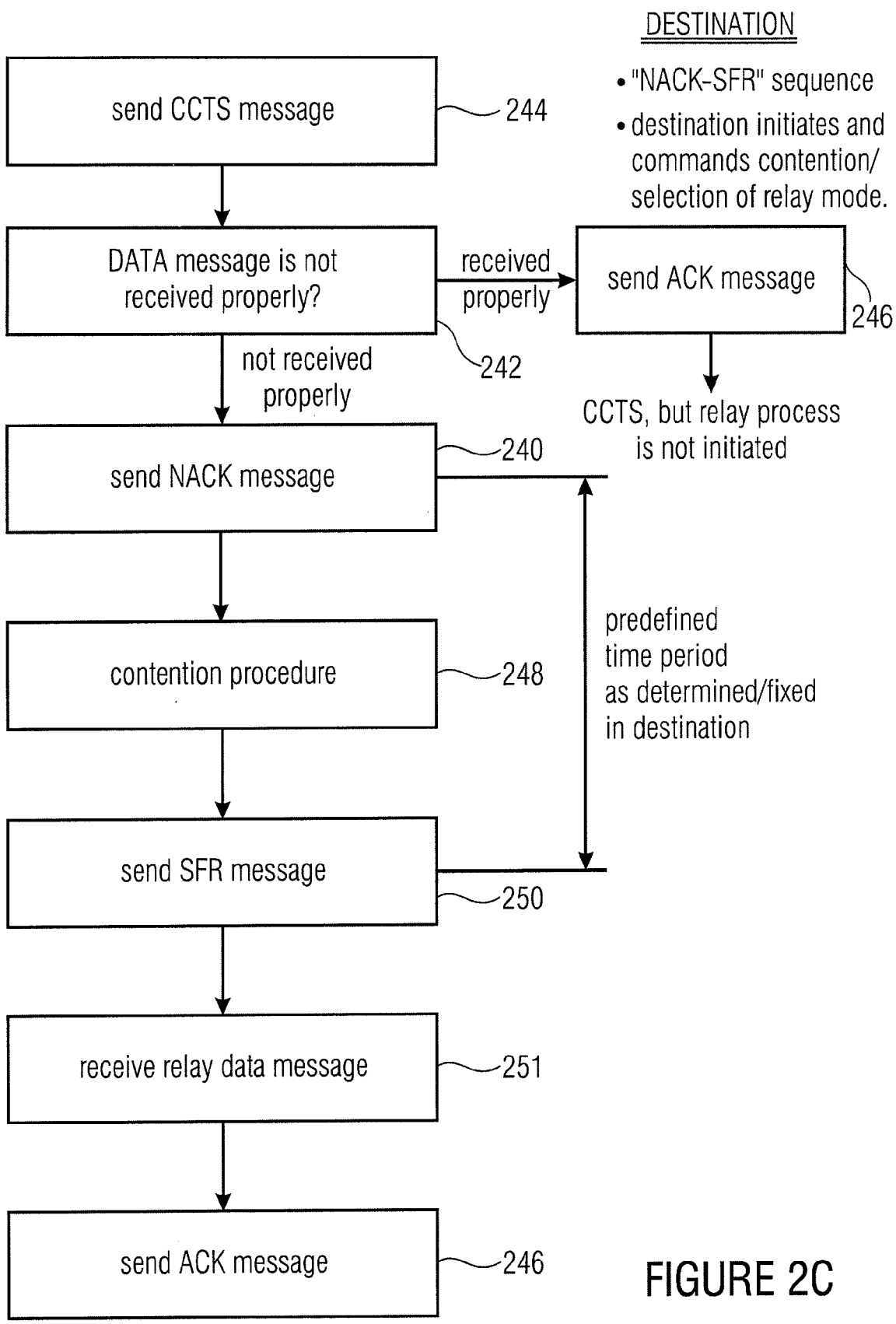
FIG. 2c is a flowchart illustrating operations performed by a wireless destination apparatus in accordance with a further aspect.

FIG. 2c illustrates a wireless destination apparatus for receiving a data message, which again comprises a transmitter section and a receiver section and a controller as illustrated in the context of FIG. 11. The controller is configured for interpreting messages received by the receiver section, and is configured for controlling the transmitter to send a negative acknowledge message 240 in response to a non-successful reception of a data message from a wireless source apparatus as indicated at 242. In an embodiment, the decision in step 242 can be preceded by the transmission of a CCTS message 244, but in other embodiments, functionality of steps 242, 240 can be invoked as well. When step 242 determines that the data message has been received properly, an ACK message is sent by the destination device as indicated at 246. This means that a full relaying process is not initiated, although a CCTS message has been sent before. This procedure is useful in the case where the determination in step 242 was too pessimistic, or when the channel is not stationary. This is a specific feature of the embodiment in that there remains a chance for a successful direct transmission, since the wireless source apparatus transmits the data message after receiving a CTS or a CCTS message irrespective of whether an actual relaying selection has already been done or not. At the time instant, where the source device sends out the data message, although having received a CCTS message from the destination apparatus in FIG. 2c, the source does not know that a relaying channel has been constructed. However, due to the inventive protocol, nothing gets lost and an efficient relay candidate selection takes place, which does not have any effect on the source device apart from the fact that the source device has to wait for a final or immediate acknowledgement from the destination.

Subsequent to the transmission of an NACK message in step 240, the contention procedure 248 takes place, which may consume a certain predefined time period as determined or as actually fixed in the destination apparatus. Thus, the controller of FIG. 11 is configured for controlling the transmitter section to send an SFR message 250 identifying selected wireless relay apparatus subsequent to sending the NACK message 240, when at least one AFR message from a wireless apparatus is received in the time period consumed by the contention procedure 240, which precedes the time of sending the SFR message 250. Finally, the transmitter section is controlled to send an acknowledgement message subsequent to a successful reception of the data message from a selected wireless relay apparatus, where this selection has taken place by the SFR message sent in step 250.

The specific feature of this aspect is the NACK-SFR sequence, which means that the NACK message provides for an efficient channel reservation in the neighborhood of the wireless destination apparatus. The destination apparatus has the possibility to receive AFR messages from potential relay candidates, and that the contents and procedure is controllably terminated by the destination device itself, i.e., by sending the SFR message 250. Thus, the destination initiates the contention selection of relay nodes, and the source device does not have to care about all this contention and more importantly, does not have to wait for a successful relay selection, but can simply transmit the data immediately after receipt of a CCTS message.

Figure 2D:
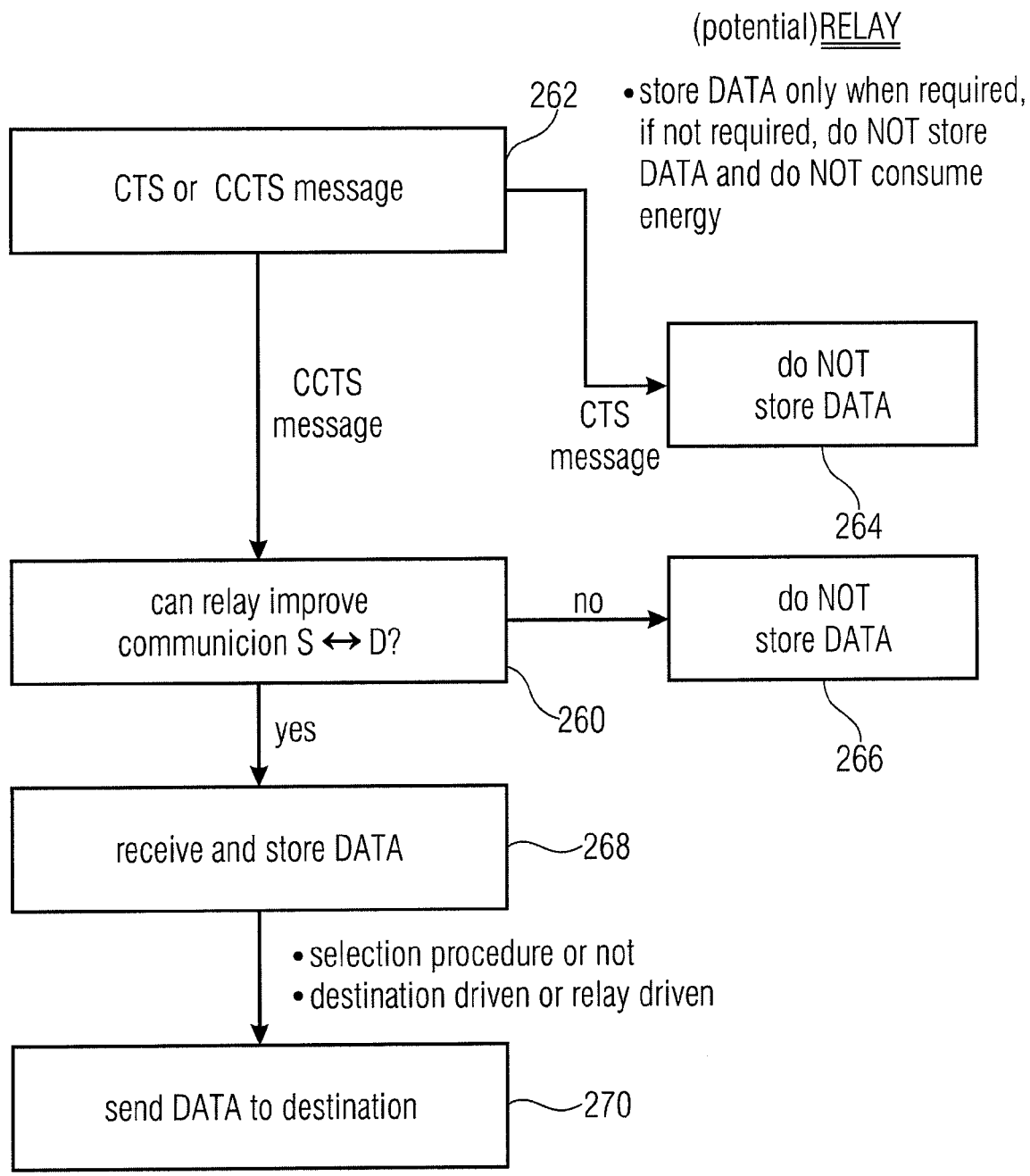
FIG. 2d is a flowchart illustrating operations performed by a potential wireless relay apparatus in accordance with a further aspect.

FIG. 2d illustrates an embodiment of a wireless relay apparatus for receiving a source data message and for transmitting a relay data message based on the source data message. Again, the relay apparatus comprises a transmitter section and a receiver section and a controller as discussed in connection with FIG. 11. The controller is configured for determining whether the wireless relay apparatus will, when operating as a wireless relay apparatus, provide a transmission channel and a wireless source apparatus to a wireless destination apparatus via the wireless relay apparatus which is better than a direct transmission channel from the wireless source apparatus to the wireless destination apparatus as indicated in step 260, or for determining whether a wireless destination apparatus actually necessitates a relay operation or does not necessitate a relay operation as illustrated in step 262. The latter determination is performed by determining, whether a CTS or CCTS message has been received when the embodiment of FIG. 4 is at issue. However, the ways to find the determinations in step 262 and 260 can be performed as well. When step 262 or step 260 results in the fact that a relay operation is not necessitated, the relay apparatus does not store the data message as indicated at 264 and 266. When however, it is determined that there is a CCTS message and that the relay improves the communication between source and destination, the wireless relay apparatus actually receives and stores the source data message as indicated in step 268. Finally, when the relay apparatus is the selected relay candidate, the data stored in step 268 is transmitted to the destination apparatus as indicated at 270. Relay operation can be a simple forward operation where the data message is stored and sent out as having been stored before. When however, the relay operation is a more advanced relay operation, than the relay apparatus will process the stored source data message to generate a different relay data message. The latter functionality is better with respect to the bit error rate, but has more delay and complexity compared to a simple repeater relay mode.

Figure 2E:
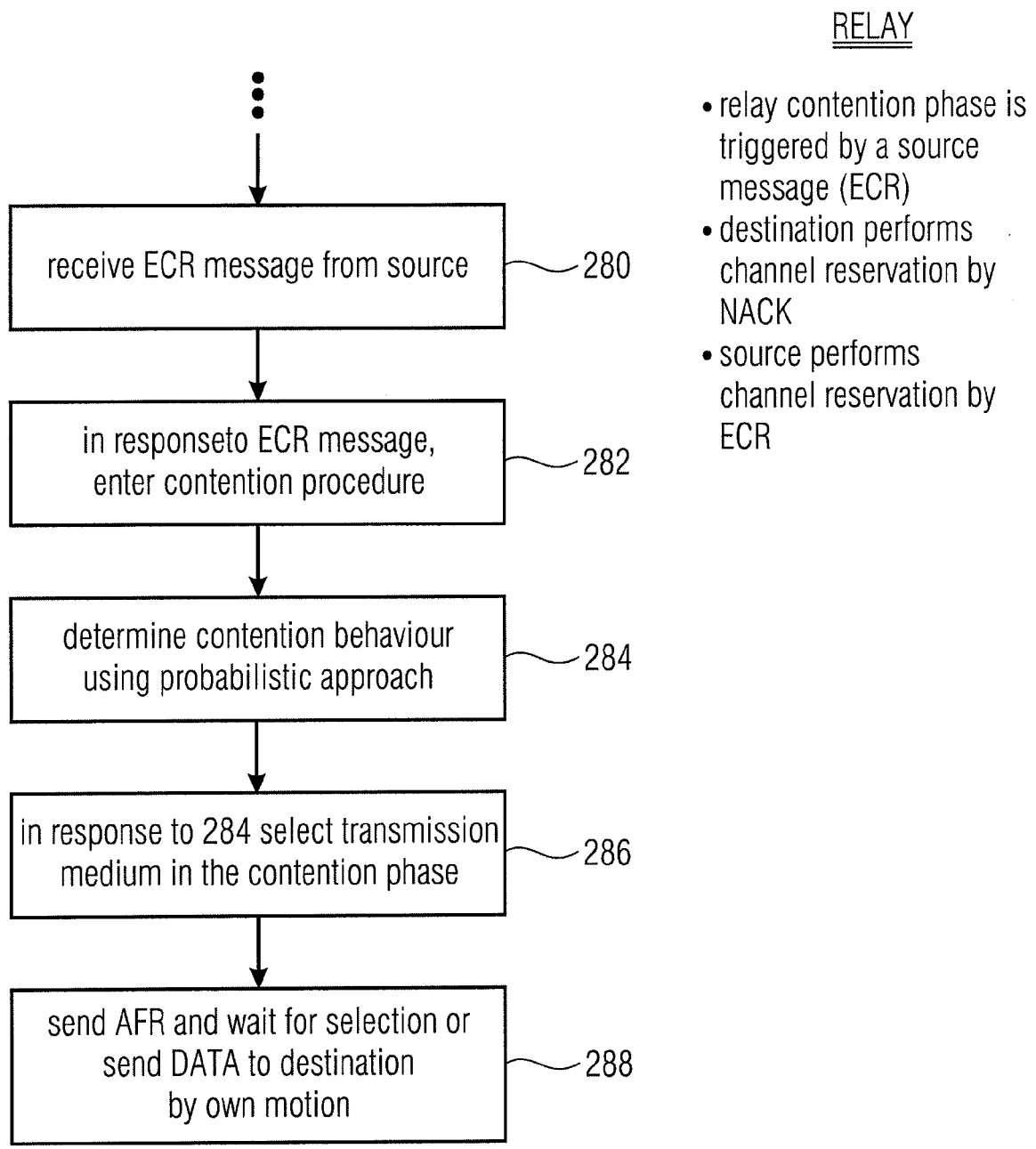
FIG. 2e is the continuation of the procedure illustrated in FIG. 2d.

FIG. 2e illustrates a wireless relay apparatus for receiving a source data message and for transmitting a relay data message based on the source data message. Again, the wireless relay apparatus illustrated in FIG. 2e illustrates a transmitter and a receiver section and a controller configured for interpreting messages received by the receiver section and configured for performing a wireless relay apparatus contention procedure when receiving an ECR message from a wireless source apparatus, from which the source data message originates as indicated in step 280. In step 282 a contention process feature is initiated in response to a reception of the ECR message. It is a feature that the ECR message starting the contention procedure comes from the wireless source device rather than the wireless destination device, since a useful relay operation has, as a precondition, that the channel between the source and the relay candidate is good enough so that a successful transmission of the data message to the relay candidate can be expected. Thus, it is made sure that when the ECR message is not successfully received by a wireless node, this wireless node will not participate in any relay contention procedure. In step 284, a contention procedure is performed by the controller in the wireless relay apparatus, which is based on probabilistic transmission. Then, in step 286, the controller performs a selection of a transmission resource from a plurality of different transmission resources in accordance with the contention procedure. The transmission resource is used for transmitting an AFR message or for transmitting a relay data message itself in case of a protocol which is different from the FIG. 4 protocol. This is indicated at step 288 in FIG. 2e. Features of this procedure are that the relay contention phase is triggered by a message from the source apparatus such as the ECR message. A further feature is that the wireless destination apparatus performs a channel reservation by an NACK message and that the source device performs a channel reservation by the ECR message so that both cooperating devices perform a channel reservation in the neighborhood of both devices.

Figure 2F:
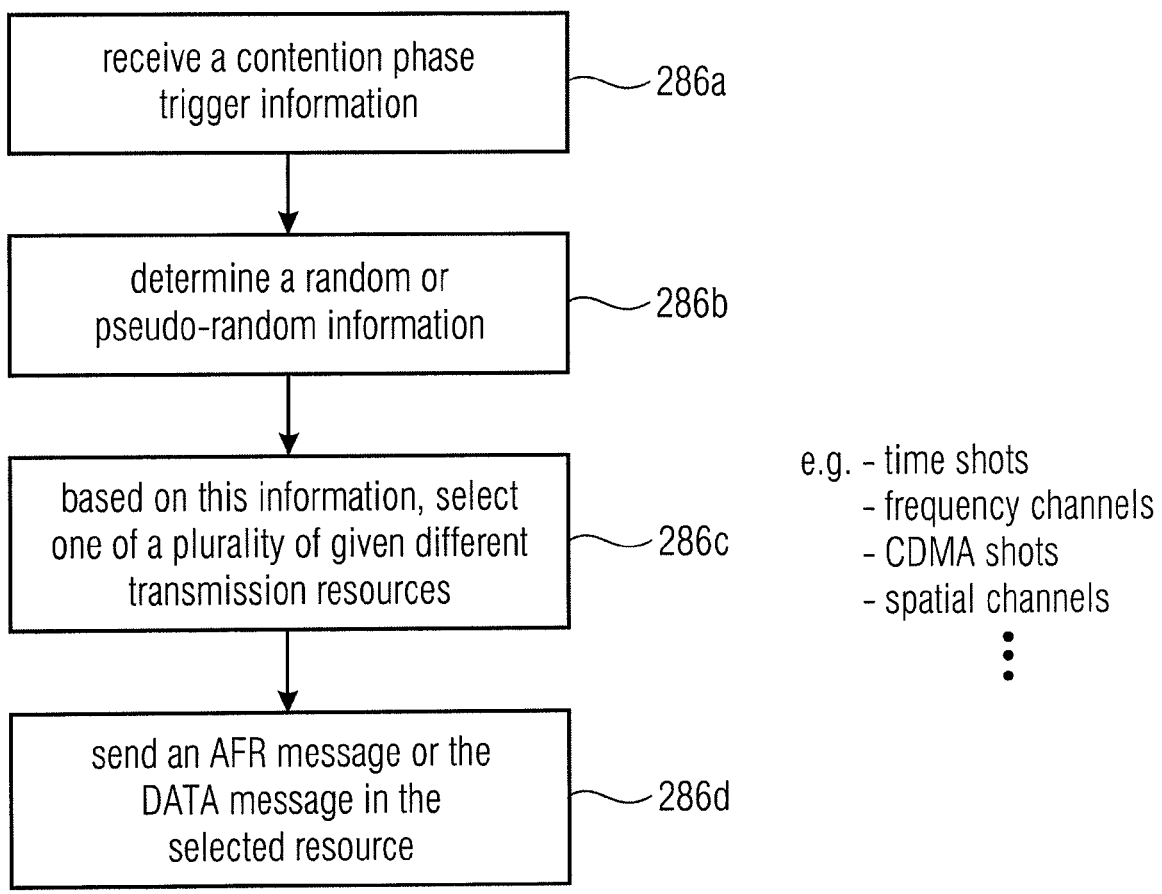
FIG. 2f is an illustration of operations performed by a wireless relay apparatus in accordance with a contention protocol.

FIG. 2f illustrates a contention protocol which can be implemented in step 286. In step 286a a contention phase trigger information is received such as an ECR message from the source or an NACK message from the destination. The ECR message from the source is advantageous as the trigger information. In step 286b the controller is configured for selecting a random or pseudo-random information. In step 286c, one of a plurality of given different transmission resources is selected, and finally in step 286d, the AFR message or the data message is transmitted in the selected transmission resource.

The transmission resource can be, for example, a time slot, a frequency channel, a CDMA slot or a spatial channel. Exemplarily, there can be the situation that there do exist six transmission slots. In this example, the random information or pseudo-random information would be a number between one and six, and in response to the selected random number, a corresponding time slot, for example, is selected in step 286c. If for example, the time slots are numbered from one to six, then the determination of the random number to be three will result in the selection of the third type of slot. This procedure, which is individually performed in each wireless relay candidate provides a minimum number of collisions in the relay contention phase, although all potential relay candidates of course, are not synchronized to each other, and in fact, even do not know about each other. In view of that, it is advantageous that the relay contention protocol is permanently or fixedly stored in each participating wireless apparatus.

Potential relays need to have successfully overheard the message from the source and have received the NACK message from the destination. After the NACK, there is a fixed number of slots where these relays send an AFR message with a given probability ρ in each slot. A relay selection is successful, if there is at least one slot where exactly one relay has sent its AFR. The transmission probability ρ is chosen in a way to maximize the expected number of slots with exactly one AFR message.

The probability p that out of m potential relays only one sends an AFR in a given slot is thus given by $$p = m\rho(1-\rho)^{m-1}. \tag{1}$$

In order to maximize p we solve $$\frac{dp}{d\rho} = 0$$

yielding $$\rho = \frac{1}{m} \text{ and } p_{max} = \left(1 - \frac{1}{m}\right)^{m-1}$$

as solution. Performing a relay selection over s slots gives a success probability $p_s$ of $$p_s = 1 - (1 - p_{max})^s. \quad (2)$$

The number of contention slots s determines the success probably $p_s$. Choosing a high s increases the time overhead of the selection process. For up to 100 relaying candidates an s of 5 yields a $p_s$ above 90% which turns out to be a good compromise between overhead for relay selection and success rate. After the reception of one or more non-colliding AFR messages, the destination selects the best relay candidate in terms of highest received SNR in its SFR message. In case the relay selection fails, the absence of the destination's SFR tells the source to continue with a retransmission attempt for the direct transmission.

The success of a transmission is a random event with the received SNR being a parameter. By looking at the current link quality one can estimate the success probability of the transmission. If this probability for the success of a direct transmission is high, relays are likely to be not needed and may pass on supporting the ongoing transmission (and overhearing it). Based on an application-dependent threshold $\Theta$, the destination can decide at reception of the RTS whether a relay is necessitated or not (compare *Relay Selection on Demand [9]*). The threshold $\Theta$ specifies the PER an application can cope with. The proposed protocol aims to keep the PER between any source destination pair below this threshold but does not try to make the transmissions as reliable as possible at the expense of the throughput. Furthermore, if cooperation is necessitated, potential relaying nodes assess their link qualities to source and destination. Only nodes which can provide an overall PER from source to the destination which is smaller than the PER of the direct channel should be considered and should consume energy overhearing the direct transmission.

For simplicity and without loss of generality we assume BPSK without channel coding in the following. A received symbol $y_i$ is given by $$y_i = h_i \cdot x_i + n_i, \quad (3)$$

where $x_i$ is the transmitted symbol, $h_i$ is the fading coefficient which is Rayleigh distributed with parameter $\sqrt{L/2}$ and $n_i$ is additive white gaussian noise with parameter $N_0$. The value L represents the path loss of the observed link and $N_0$ is the spectral noise density. In the case of quasi-static fading, the fading coefficient $h_i$ is constant for the transmission of one packet. The BER is given by [3]

$$BER = 0.5 \cdot \text{erfc}\left(\sqrt{\frac{h_i^2 E_b}{N_0}}\right), \quad (4)$$

with $E_b$ being the energy per bit at transmitter side. For uncoded messages with j bits per packet calculation of the PER is straightforward and given by $$PER = 1 - (1 - BER)^j. \quad (5)$$

The PER of the source-relay and relay-destination channel is then obtained as $$PER_{SRD} = 1 - (1 - PER_{SR})(1 - PER_{RD}) \quad (6)$$

where $PER_{SR}$ and $PER_{RD}$ are the PER for the source-relay and the relay-destination message transmissions, respectively.

Whenever the direct channel between source and destination provides a PER which is lower than the specified threshold value $\Theta$, a regular CTS message is used to inform source and neighbors that no cooperation is necessitated. In all other cases the destination uses a CCTS which additionally contains the current SNR of the direct link.

Potential relaying candidates determine the PER of the direct link by using (5) with the SNR information obtained from CCTS and control their own capability to improve the reliability of this transmission by evaluating (6) using their own link qualities measured by reception of RTS and CCTS packets. If the expected PER of the given relay channel is below the expected PER of the direct channel, the corresponding relay will listen to the transmission of the source.

The overall concepts have been implemented in a protocol named CoRe-MAC and evaluated using the wireless sensor network simulator JProwler [4].

In the simulation, all control messages such as RTS and CTS as well as data messages with different length are accounted for. Control messages are assumed to be transmitted with half of the transmission rate of data packets and thus experience a lower BER than the transmission of the data messages. The simulation setup features a dedicated pair of a source and a destination node (one hop), with potential relays being distributed around them uniformly randomly with a given density. The distance between source node S and destination node D (SD-distance) is varied during an experiment run in order to infer about the protocol's performance at various signal qualities. The experiments are repeated with different deployments of the potential relay nodes until the simulation results show an accuracy of ±1% within a 95% confidence interval.

If not stated otherwise, the settings summarized in FIG. 6 are used in the simulations. The node density is assumed to be known by the nodes and is used to predict the number of potential relays (parameter m) for the relay selection process. The node density is currently a configuration parameter that needs to be set at deployment. However, the algorithm is robust against mispredictions of this value, so an approximate node density is sufficient.

Figure 7:
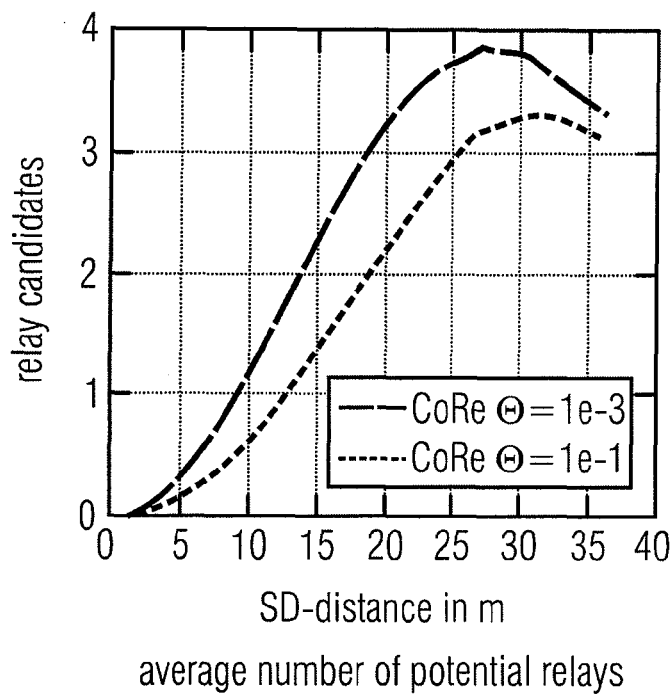
FIGS. 7-10 are different simulation results of an implementation.

Relay Candidates: FIG. 7 shows the number of relay candidates averaged over all transmission attempts of the source (cooperative and non-cooperative ones) and thus reflects the additional amount of data message receptions due to cooperation. If the PER of the SD-channel is above the $\Theta$ threshold, relays will not overhear the following data transmission. In the case of a small $\Theta$, relays are often set to overhear messages, which comes at the cost of energy consumption for the relaying nodes while listening or the non-availability of these nodes to other communications while they are listening. On the other hand, a high $\Theta$ increases the chance that relaying was not activated when a direct transmission fails. For $\Theta=1$, a protocol without relaying is obtained. The higher the distance and the lower $\Theta$, the more relays are activated to listen in average. For large distances, this number decreases due to the lower number of potential relays.

Figure 8:
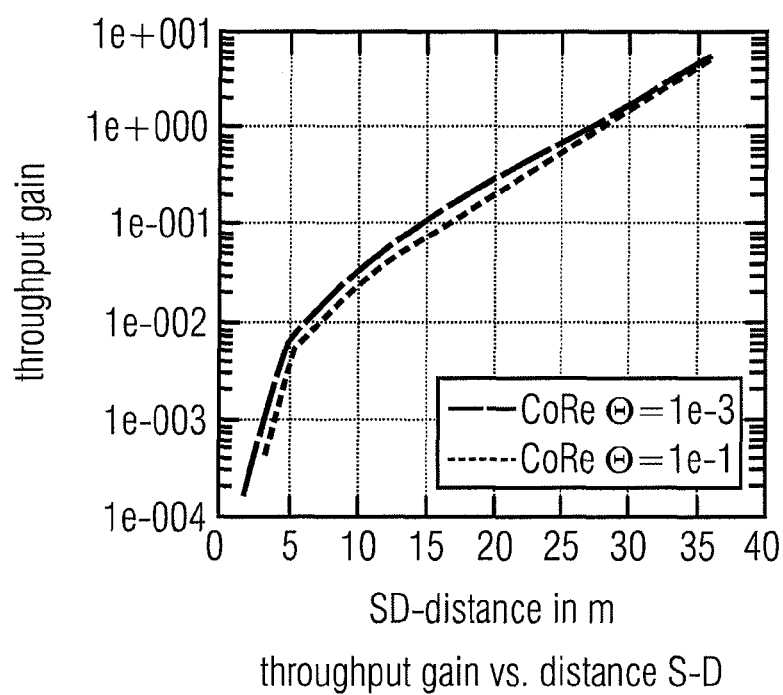

Throughput: FIG. 8 compares the throughput gains of CoRe-MAC to standard CSMA/CA for different $\Theta$ values. If the SD-distance is small, the probability for lost or incomplete messages is comparably low and CoRe-MAC operates mostly in the mode without relaying. Thus the performance of both protocols is similar if the SNR between source and destination is good.

With increasing distance more transmissions fail. Here, the standard CSMA/CA protocol tries to overcome this with retransmissions while CoRe-MAC uses alternative paths via relaying. Due to the coherence of the channel state, retransmissions on the direct channel tend to fail more likely than relayed transmissions, which leads to a significantly better throughput for CoRe-MAC.

For very low SNR, direct transmissions fail very often while the relaying protocol is still able to provide communication. In this case, the relaying protocol is invoked very often and the relay behaves as an additional hop between source and destination.

Figure 9A:
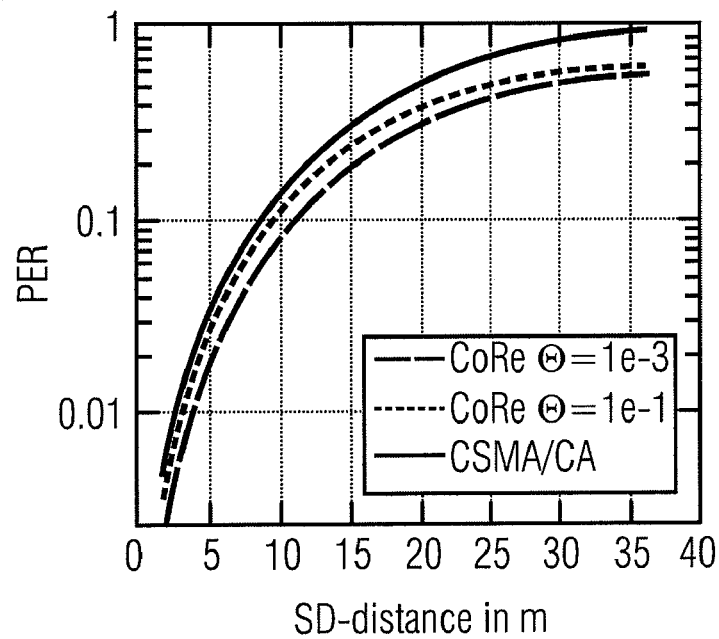
Figure 9B:
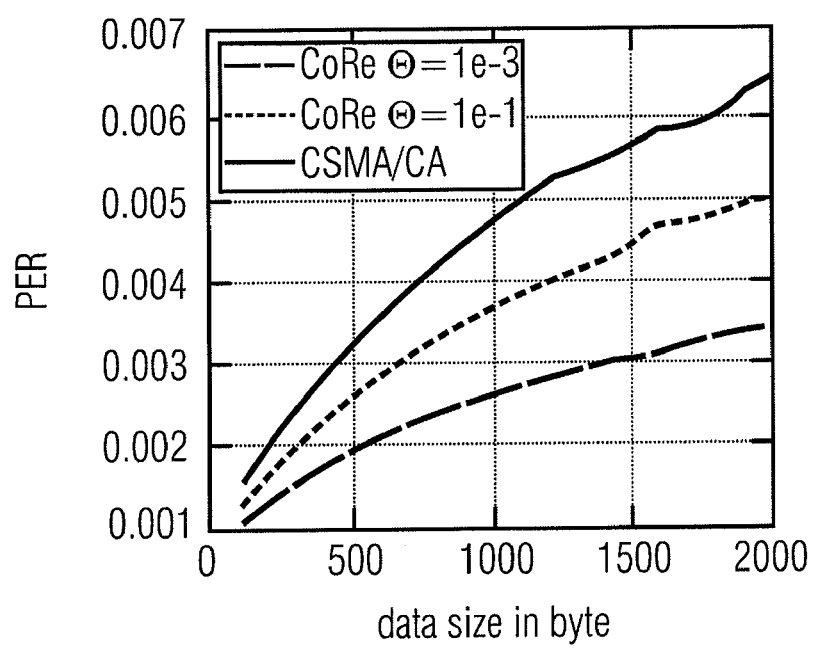
Figure 9C:
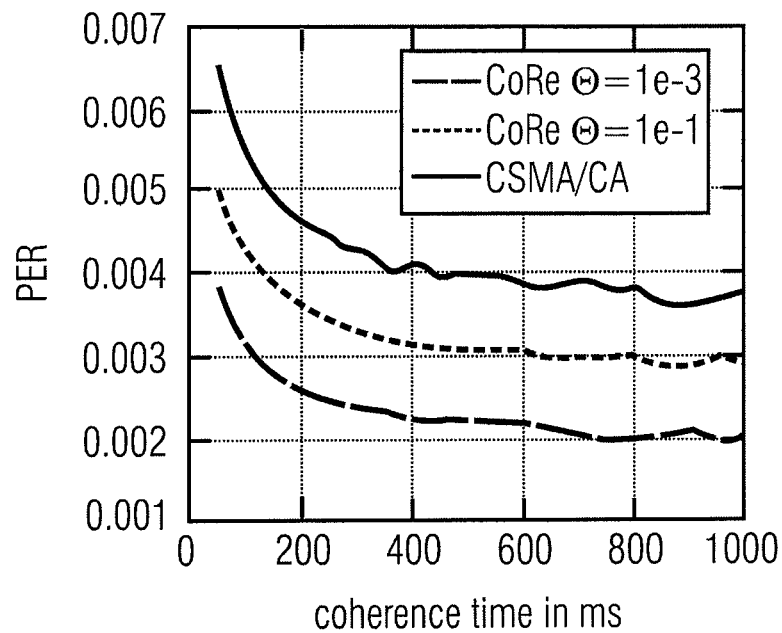

PER: FIG. 9a-9c illustrate the PER, i.e., the ratio of the number of messages not received to the number of messages originated by the source, as function of different parameters. A message transfer is considered successful, if its transmission succeeds, with or without the help of relaying operations or retransmissions. In FIG. 8 the PER is depicted as function of the SD-distance. As expected, the PER increases with the distance. However, the relaying protocol is able to provide a lower PER, especially at large distances. Again, there is a tradeoff between Θ as activation threshold for the relays and the resulting PER.

FIG. 9e shows the dependence of PER to the length of the data message for distance of 2 m between source and destination. With increasing message size the PER for our protocol as well as for the CSMA/CA protocol increases. This is on the one hand a result of the decreasing PER for smaller messages and on the other hand is influenced by the coherence time of the channel—for larger messages it is less likely that the channel state is coherent when doing a retransmission. Cooperative relaying is more important if the message size is large. The selection of the appropriate Θ value also depends on the message size.

The influence of the coherence time of the channel on the PER is illustrated in FIG. 9c. With increasing coherence time the PERs of the investigated protocols decrease. However, CoRe-MAC outperforms CSMA/CA for the whole range of considered coherence times. For small coherence time values, the channel changes considerably between channel reservation and data transmission, resulting in a higher PER.

Figure 10:
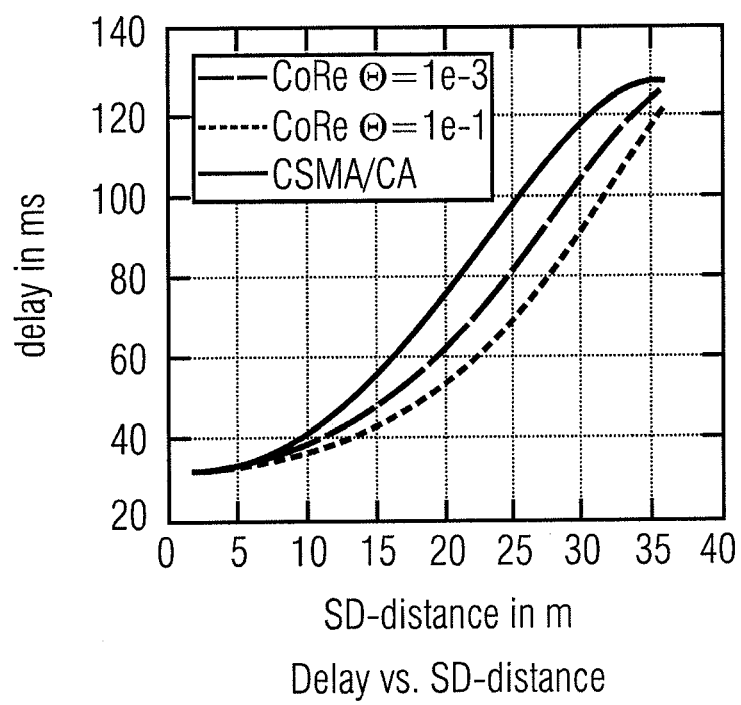

Average Delay: Since CoRe-MAC performs the relay selection only after a failure of the direct transmission we expect no extra overhead in the data transmission time in comparison to standard CSMA/CA. As criteria we use the delay, defined as the time from the start of a data transmission at the source until successful reception of the whole data at the destination. It contains signaling overhead, retransmissions, and cooperative transmissions. FIG. 10 depicts the average delay of the different protocols (with two different settings for Θ) and supports aforementioned hypothesis. The relaying protocol is able to reduce the delay in case the direct transmission fails, since on average it needs less time in relaying the message than the standard protocol needs for multiple retransmissions. For large distances, however, the average transmission time of CSMA/CA is shorter than with relaying. This is due to the case that at these distances most direct transmissions fail and do not enter the statistic. The few that are received witness a good channel condition and thus have a shorter delay than most relayed communications.

The invention features a new approach for cooperative relaying based on mobile devices executing the CoRe-MAC protocol, a MAC protocol for cooperative relaying which builds on the IEEE 802.11 mechanisms. Special attention was paid to the feasibility of the protocol for state-of-the-art hardware and to the evaluation of its performance under realistic assumptions.

The protocol extends the IEEE 802.11 mechanisms for handling transmission failures by space/time diverse channels. In the case the direct transmission is successful, however, our protocol comes with no additional overhead for the relay selection. Thus, for good SNR between source and destination CoRe-MAC has similar performance as the standard CSMA/CA approach. In the case of a transmission failure, e. g., due to small scale fading, our approach supports transmission via a different communication path implementing spatial diversity via a selected relay. Thus, especially for transmission over unreliable communication links, the throughput, the delay, and reliability of wireless communication can be improved.

In contrast to existing approaches, the presented approach is innovative in the following aspects: (1) Relay devices do only activate the overhearing of signals in case of weak signal quality between sender and receiver. (2) The selection of relay devices is done on demand only. (3) A specific process (protocol) for the reservation of the wireless medium for the entire cooperative communication has been specified.

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus.

Depending on certain implementation requirements, embodiments of the invention can be implemented in hardware or in software. The implementation can be performed using a digital storage medium, for example a floppy disk, a DVD, a CD, a ROM, a PROM, an EPROM, an EEPROM or a FLASH memory, having electronically readable control signals stored thereon, which cooperate (or are capable of cooperating) with a programmable computer system such that the respective method is performed.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods are performed by any hardware apparatus.

While this invention has been described in terms of several advantageous embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

REFERENCES

[1] W. Elmenreich and N. Marchenko and H. Adam and C. Hofbauer and G. Brandner and C. Bettstetter and M. Huemer. Building blocks of cooperative relaying in wireless systems. *e & i, Springer*, 125(10):353-359, 2008.

[2] Michael R. Souryal and Branimir R. Vojcic. Performance of Amplify-and-Forward and Decode-and-Forward Relaying in Rayleigh Fading with Turbo Codes. *Proc. ICASSP*, pages 681-684, Toulouse, France, 2006. IEEE.

[3] K. D. Kammeyer. *Nachrichtenübertragung*. Teubner, 3rd edition, 2004.

[4] G. Simon and P. Völgyesi and M. Maròti and À. Lèdeczi. Simulation-based optimization of communication protocols for large-scale wireless sensor networks. *Proc. IEEE Aerospace Conference*, pages 1339-1346, Big Sky, Mont., 2003.

[5] Bletsas, A. and Shin, H. and Win, M. Z. Outage-Optimal Cooperative Communications with Regenerative Relays. *Proc. Ann. Conf. Information Sciences and Systems*, Princeton, N.J., 2006.

[6] K.-S. Hwang and Y.-C. Ko. An Efficient Relay Selection Algorithm for Cooperative Networks. *Proc. IEEE VTC-Fall*, Baltimore, Md., 2007.

[7] Beres, E. and Adve, R. On Selection Cooperation in Distributed Networks. *Proc. of Conference on Information Sciences and Systems*, pages 1056-1061, Princeton, N.J., 2006.

[8] Y. Chen and G. Yu and P. Qiu and Z. Zhang. Power-Aware Cooperative Relay Selection Strategies in Wireless Ad Hoc Networks. *Proc. IEEE PIMRC*, Helsinki, Finland, 2006.

[9] H. Adam and C. Bettstetter and S. M. Senouci. Adaptive Relay Selection in Cooperative Wireless Networks. *Proc. IEEE PIMRC*, Cannes, France, 2008.

[10] Bletsas, A. and Khisti, A. and Reed, D. P. and Lippman, A. A Simple Cooperative Diversity Method Based on Network Path Selection. *IEEE J. Select. Areas Commun.*, 24(3):659-672, 2006.

[11] Feeney, L. M. and Nilsson, M. Investigating the Energy Consumption of a Wireless Network Interface in an Ad Hoc Networking Environment. *Proc. IEEE INFOCOM*, Anchorage, Ak., 2001.

[12] J. N. Laneman and D. N. C. Tse and G. W. Wornell. Cooperative Diversity in Wireless Networks: Efficient Protocols and Outage Behavior. *IEEE J. Select. Areas Commun.*, 50(12):3062-3080, 2004.

[13] C.-T. Chou and J. Yang and D. Wang. Cooperative MAC Protocol with Automatic Relay Selection in Distributed Wireless Networks. *Proc. Pervasive Computing and Communications Workshops*, White Plains, N.Y., 2007.

[14] P. Liu and Z. Tao and S. Narayanan and T. Korakis and S. S. Panwar. CoopMAC: A Cooperative MAC for Wireless LANs. *IEEE J. Select. Areas Commun.*, 25(2):340-354, 2007.

[15] Sangman Moh and Chansu Yu and Seung-Min Park and Heung-Nam Kim. CD-MAC: Cooperative Diversity MAC for Robust Communication in Wireless Ad Hoc Networks. *Proc. IEEE ICC*, pages 3636-3641, Glasgow, Scotland, 2007.

The invention claimed is:

1. Wireless relay apparatus for receiving a source data message and for transmitting a relay data message based on the source data message, comprising:
   a transmitter section and a receiver section; and
   a controller
   configured for determining, whether the wireless relay apparatus will, when operating as a wireless relay apparatus, provide a transmission channel from a wireless source apparatus to a wireless destination apparatus via the wireless relay apparatus, which is better than a direct transmission channel from the wireless source apparatus to the wireless destination apparatus or for determining, whether the wireless destination apparatus necessitates a relay operation or does not necessitate a relay operation;
   configured for storing the source data message from a wireless source apparatus only when the transmission channel via the wireless relay apparatus is better than the direct transmission channel or when a relay operation is necessitated, and for not storing the source data message in the other case; and
   configured for controlling the transmitter to transmit the relay data message, the relay data message being based on the stored source data message,
   wherein a cooperative clear to send message received comprises a channel condition estimate on the direct transmission channel between the wireless source apparatus and the wireless destination apparatus, and wherein the controller is configured for extracting the channel condition estimate from the cooperative clear to send message received to acquire a direct channel information,
   wherein the controller is configured for determining a relay channel information for the transmission channel from the wireless source apparatus via the wireless relay apparatus to the wireless destination apparatus, and
   wherein the controller is configured for comparing the direct channel information and the relay channel information to determine, whether the wireless relay apparatus will provide a better transmission channel.

2. Wireless relay apparatus in accordance with claim 1,
   in which the controller is configured for only being ready for storing a source data message subsequent to the cooperative clear to send message received and for not being ready for storing subsequent to a received clear to send message,
   in which the controller is configured for actually storing the source data message subsequent to the received cooperative clear to send message and when the transmission channel via the wireless apparatus is better than the direct channel, and
   in which the controller is configured for not storing the source data when the controller is ready for storing and when the transmission channel via the wireless relay apparatus is not better than the direct channel.

3. A wireless relay apparatus in accordance with claim 1,
in which the controller is configured for determining a first channel information for a channel between the wireless source apparatus and the wireless relay apparatus based on a request to send message received,
in which the controller is configured for determining a channel information for a second channel between the wireless relay apparatus and the wireless destination apparatus based on a clear to send message received, and
in which the controller is configured for determining a third channel information on the transmission channel via the wireless relay apparatus based on the first channel information and on the second channel information.

4. Wireless relay apparatus in accordance with claim 1, in which the controller is configured for controlling the transmitter section to transmit an apply for relay message in response to reception of an extended channel reservation message from the wireless source device.

5. Wireless relay apparatus in accordance with claim 4,
in which the controller is configured for controlling the transmitter section to transmit the relay data message only after receipt of a select for relay message identifying the wireless relay apparatus.

6. Wireless destination apparatus for receiving a data message, comprising:
a transmitter section and a receiver section; and
a controller
configured for interpreting messages received by the receiver section;
configured for estimating a channel condition between a wireless source apparatus and the wireless destination apparatus in response to a request to send message originating from the wireless source apparatus;
configured for controlling the transmitter section to transmit a clear to send message when the channel condition is good enough without a relaying operation and to transmit a cooperative clear to send message when the channel condition is so that a relaying operation will become necessitated, wherein the controller is configured to form the cooperative clear to send message so that a channel condition estimate is comprised in the cooperative clear to send message,
wherein the controller is in a relay mode, when the cooperative clear to send message is transmitted and is in a non-relay mode, when the clear to send message is transmitted, and
wherein the controller is configured to control the transmitter section to transmit, in the non-relay mode, an acknowledge message subsequent to transmitting a clear to send message and a successful receipt of a source data message, and to transmit, in the relay mode, a negative acknowledge message subsequent to transmitting a cooperative clear to send message and a non-successful receipt of the source data message.

7. Wireless destination apparatus in accordance with claim 6, in which the channel condition estimate is a signal to noise ratio determined by a reception of the request to send message.

8. Wireless destination apparatus in accordance with claim 6,
in which the controller is configured for controlling the transmitter section to transmit, in the relay mode, the acknowledge message subsequent to a successful receipt of a relay data message from a wireless relay apparatus.

9. Method of operating a wireless relay apparatus for receiving a source data message and for transmitting a relay data message based on the source data message, comprising a transmitter section and a receiver section; and a controller, the method comprising:
determining, whether the wireless relay apparatus will, when operating as a wireless relay apparatus, provide a transmission channel from a wireless source apparatus to a wireless destination apparatus via the wireless relay apparatus, which is better than a direct transmission channel from the wireless source apparatus to the wireless destination apparatus or determining, whether the wireless destination apparatus necessitates a relay operation or does not necessitate a relay operation;
storing the source data message from a wireless source apparatus only when the transmission channel via the wireless relay apparatus is better than the direct transmission channel or when a relay operation is necessitated, and not storing the source data message in the other case; and
controlling the transmitter to transmit the relay data message, the relay data message being based on the stored source data message,
wherein a cooperative clear to send message received comprises a channel condition estimate on the direct transmission channel between the wireless source apparatus and the wireless destination apparatus, and wherein the channel condition estimate is extracted from the cooperative clear to send message received to acquire a direct channel information,
wherein a relay channel information for the transmission channel from the wireless source apparatus via the wireless relay apparatus to the wireless destination apparatus is determined, and
wherein the direct channel information and the relay channel information are compared to determine, whether the wireless relay apparatus will provide a better transmission channel.

10. Method of operating a wireless destination apparatus for receiving a data message, comprising a transmitter section and a receiver section; and a controller, the method comprising:
interpreting messages received by the receiver section;
estimating a channel condition between a wireless source apparatus and the wireless destination apparatus in response to a request to send message originating from the wireless source apparatus;
controlling the transmitter section to transmit a clear to send message when the channel condition is good enough without a relaying operation and transmitting a cooperative clear to send message when the channel condition is so that a relaying operation will become necessitated,
wherein, when the clear to send message is transmitted, an acknowledge message is transmitted subsequent to transmitting the clear to send message and a successful receipt of a source data message, and
wherein, when the cooperative clear to send message is transmitted, a negative acknowledge message is transmitted subsequent to transmitting the cooperative clear to send message and a non-successful receipt of the source data message.

11. Computer program for performing, when running on a computer, the method of operating a wireless relay apparatus for receiving a source data message and for transmitting a relay data message based on the source data message, comprising a transmitter section and a receiver section; and a controller, the method comprising:

determining, whether the wireless relay apparatus will, when operating as a wireless relay apparatus, provide a transmission channel from a wireless source apparatus to a wireless destination apparatus via the wireless relay apparatus, which is better than a direct transmission channel from the wireless source apparatus to the wireless destination apparatus or determining, whether the wireless destination apparatus necessitates a relay operation or does not necessitate a relay operation;

storing the source data message from a wireless source apparatus only when the transmission channel via the wireless relay apparatus is better than the direct transmission channel or when a relay operation is necessitated, and not storing the source data message in the other case; and controlling the transmitter to transmit the relay data message, the relay data message being based on the stored source data message, wherein a cooperative clear to send message received comprises a channel condition estimate on the direct transmission channel between the wireless source apparatus and the wireless destination apparatus, and wherein the channel condition estimate is extracted from the cooperative clear to send message received to acquire a direct channel information, wherein a relay channel information for the transmission channel from the wireless source apparatus via the wireless relay apparatus to the wireless destination apparatus is determined, and wherein the direct channel information and the relay channel information are compared to determine, whether the wireless relay apparatus will provide a better transmission channel.

12. Computer program for performing, when running on a computer, the method of operating a wireless destination apparatus for receiving a data message, comprising a transmitter section and a receiver section; and a controller, the method comprising:

interpreting messages received by the receiver section;

estimating a channel condition between a wireless source apparatus and the wireless destination apparatus in response to a request to send message originating from the wireless source apparatus;

controlling the transmitter section to transmit a clear to send message when the channel condition is good enough without a relaying operation and transmitting a cooperative clear to send message when the channel condition is so that a relaying operation will become necessitated, wherein, when the clear to send message is transmitted, an acknowledge message is transmitted subsequent to transmitting the clear to send message and a successful receipt of a source data message, and wherein, when the cooperative clear to send message is transmitted, a negative acknowledge message is transmitted subsequent to transmitting the cooperative clear to send message and a non-successful receipt of the source data message.

* * * * *